US006321060B1

(12) United States Patent
Nakayasu et al.

(10) Patent No.: US 6,321,060 B1
(45) Date of Patent: Nov. 20, 2001

(54) PRINTING APPARATUS

(75) Inventors: Hirofumi Nakayasu; Youji Houki; Tsutomu Nagatomi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/583,085

(22) Filed: Apr. 16, 1999

Related U.S. Application Data

(62) Division of application No. 09/086,956, filed on May 29, 1998, now Pat. No. 5,946,537.

(30) Foreign Application Priority Data

Nov. 28, 1997 (JP) .................................................. 09-327354

(51) Int. Cl.$^7$ .................................................. G03G 15/01
(52) U.S. Cl. .......................................... 399/301; 347/116
(58) Field of Search ...................... 399/49, 301; 347/116; 356/429, 446; 382/112; 101/181; 250/559.44

(56) References Cited

U.S. PATENT DOCUMENTS

| | | | |
|---|---|---|---|
| 4,916,547 | 4/1990 | Katsumata et al. | 358/300 |
| 5,287,162 | 2/1994 | Jong et al. | 399/49 |
| 5,412,577 | 5/1995 | Sainio et al. | 364/469.03 |
| 5,457,518 | 10/1995 | Ashikaga et al. | 355/208 |
| 5,523,823 | 6/1996 | Ashikaga | 355/208 |
| 5,896,472 | * 4/1999 | Takayama | 347/116 X |
| 5,946,537 | * 8/1999 | Nakayasu et al. | 399/301 |

FOREIGN PATENT DOCUMENTS

| | | |
|---|---|---|
| 0 774 697 A2 | 5/1997 | (EP) . |
| 4-16958 | 1/1992 | (JP) . |
| 4-131876 | 5/1992 | (JP) . |
| 8-262830 | 10/1996 | (JP) . |
| 8-305233 | 11/1996 | (JP) . |
| 9-90697 | 4/1997 | (JP) . |

* cited by examiner

*Primary Examiner*—Joan Pendegrass
(74) *Attorney, Agent, or Firm*—Armstrong, Westerman, Hattori, McLeland & Naughton, LLP

(57) ABSTRACT

A plurality of resist marks of K, C, M and Y color toner components are transferred at predetermined pitches onto a belt for conveying record paper, by means of a plurality of electrostatic recording units. The resist marks are optically detected by sensors. A positional offset detection unit detects positions of resist lines from phases φ obtained through Fourier transform of sensor detection signals, and employs as the reference the detected position of the resist mark of K component to thereby detect positional offsets of the detected positions of the resist marks of the other C, M and Y color toner components. A positional offset correction unit corrects the transferred positions of the other C, M and Y color toner components so as to eliminate any positional offsets relative to the K component image.

2 Claims, 23 Drawing Sheets

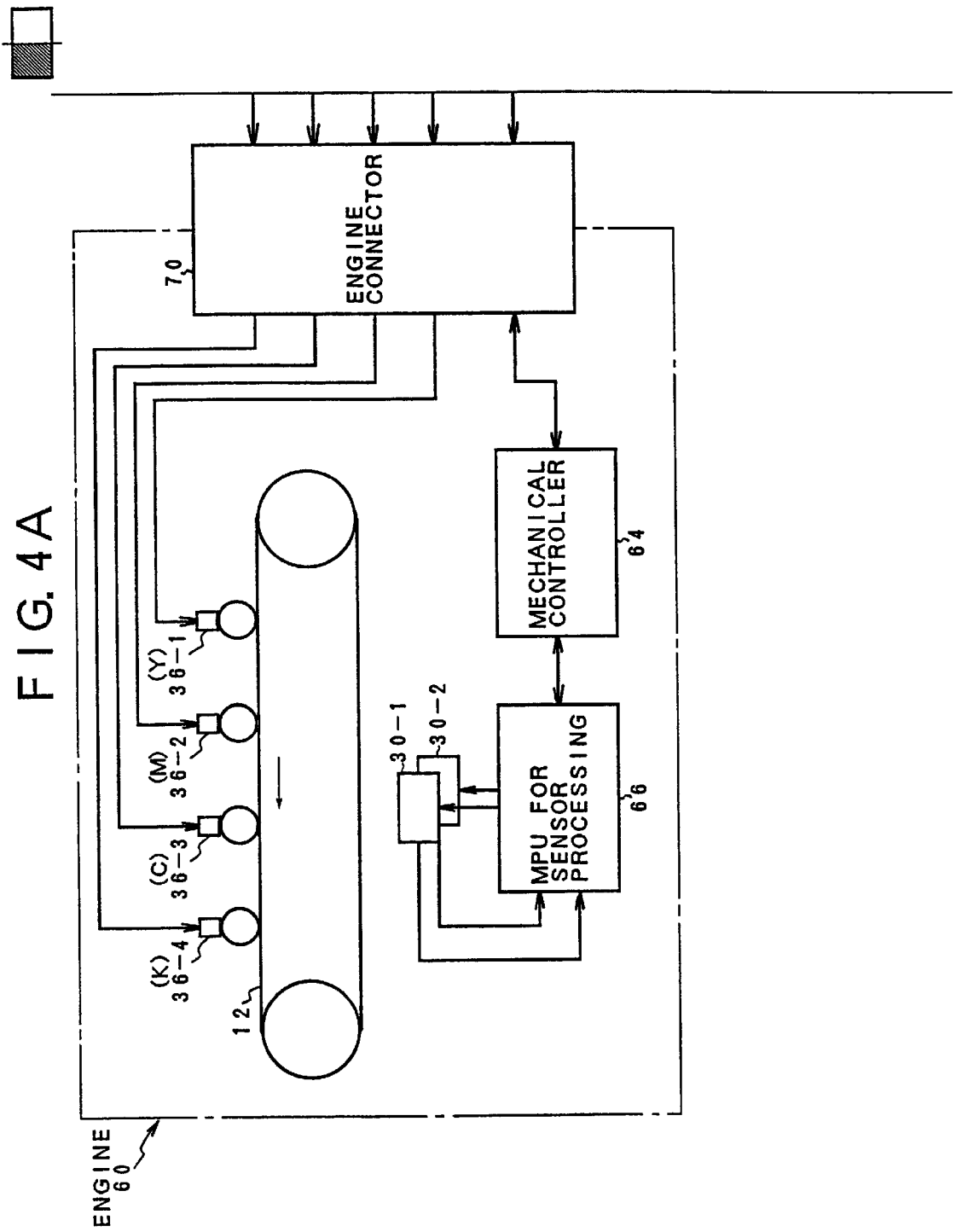

FIG. 17A
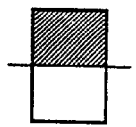
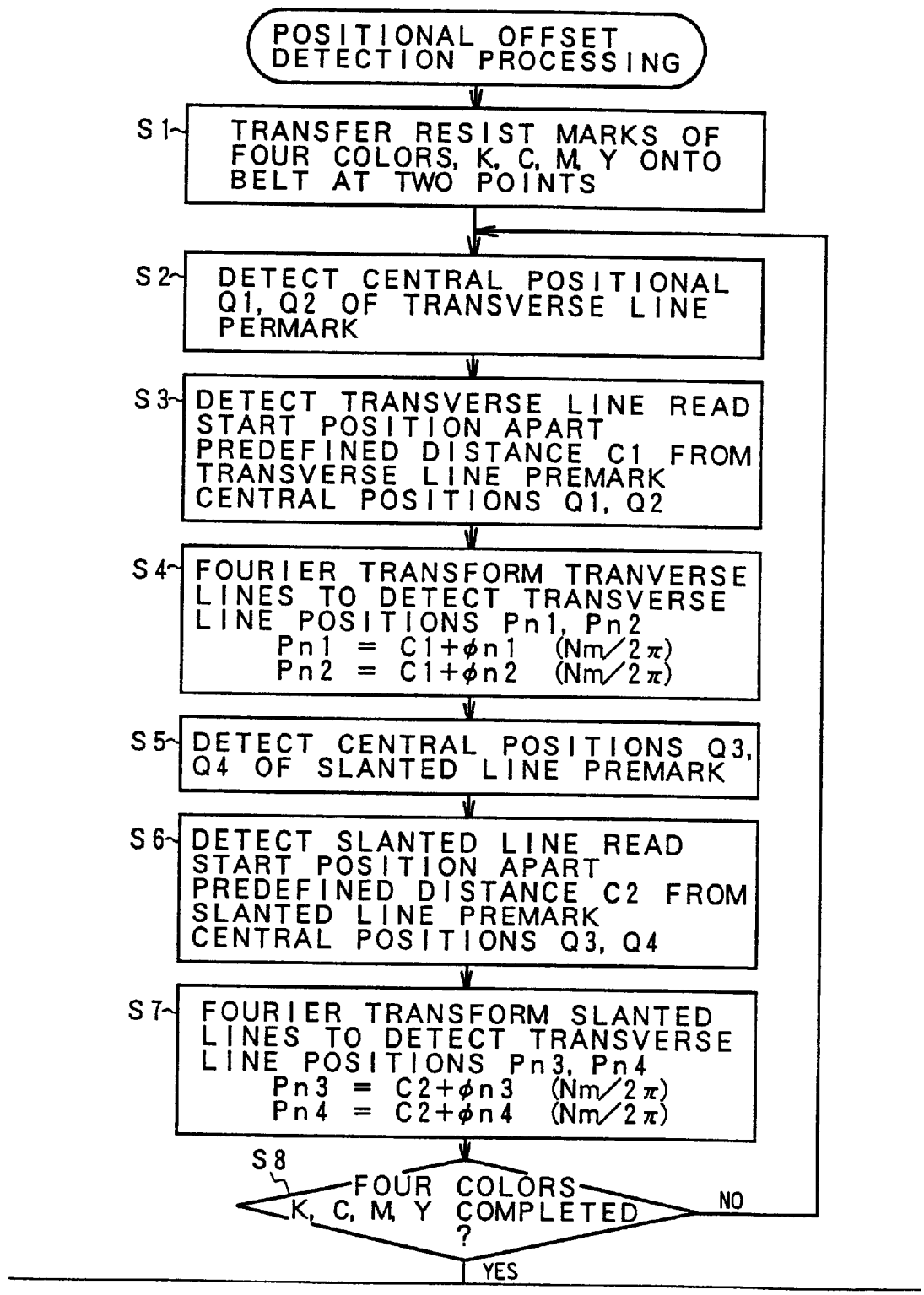

FIG. 17B

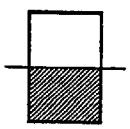

S9 — CALCULATE ABSOLUTE POSITION Xk OF K IN HORIZONTAL SCANNING DIRECTION
$X_k = \{$(LEFT SLANTED LINE POSITION P3) − (LEFT TRANSVERSE LINE POSITION P1) + (RIGHT SLANTED LINE POSITION P4) − (RIGHT TRANSVERSE LINE POSITION P2)$\} / (L_s/L_h)$

S10 — CALCULATE SKEW ABSOLUTE VALUE $Z_k$ OF K
$Z_k =$ (RIGHT TRANSVERSE LINE POSITION P2) − (LEFT TRANSVERSE LINE POSITION P1)

S11 — CALCULATE CORRECTION VALUS $\Delta x$ OF C, M, Y IN HORIZONTAL SCANNING DIRECTION
$(\Delta x)$ C, M, Y = $\{$(LEFT SLANTED LINE POSITION P3) − (LEFT TRANSVERSE LINE POSITION P1) + (RIGHT SLANTED LINE POSITION P4) − (RIGHT TRANSVERSE LINE POSITION P2)$\} / 2(L_s/L_h)$ − (ABSOLUTE POSITION $A_k$ OF K IN HORIZONTAL SCANNING DIRECTION)

S12 — CALCULATE CORRECTION VALUS $\Delta y$ OF C, M, Y IN VERTICAL SCANNING DIRECTION
$(\Delta y)$ C, M, Y = $\{$(RIGHT TRANSVERSE LINE POSITIONS P2 OF C, M, Y) − (LEFT TRANSVERSE LINE POSITION P1 OF K) − (K − PREDEFINED DISTANCE C3 AMONG C, M, Y)$ / $(BELT VELOCITY $V_b$)

S13 — CALCULATE SKEW CORRECTION VALUE $\Delta z$
$(\Delta z)$ C, M, Y = (RIGHT TRANSVERSE LINE POSITIONS P2 OF C, M, Y) − (LEFT TRANSVERSE LINE POSITIONS P1 OF C, M, Y) − (SKEW ABSOLUTE VALUE $Z_k$ OF K)

RETURN

FIG. 21

| PIXEL ADDRESS IN HORIZONTAL SCANNING DIRECTION | CORRECTION VALUE |
|---|---|
| CORRECTION TABLE FOR CYAN | |
| 0 0 0 0 | 0 |
| 0 0 0 1 | 0 |
| 0 0 0 2 | −1 |
| 0 0 0 3 | −1 |
| 0 0 0 4 | −1 |
| 0 0 0 5 | −1 |
| 0 0 0 6 | −1 |
| ⋮ | ⋮ |
| 1 9 9 8 | −3 |
| 1 9 9 9 | −3 |

PRINTING APPARATUS

This application is a division of prior application Ser. No. 09/086,956 filed on May 29, 1998, now U.S. Pat. No. 5,946,537 issued on Aug. 31, 1999.

BACKGROUND OF THE INVENTION

1. Field of the Invention

The present invention relates generally to a printing apparatus for printing color images through superposed transfer of different color images by means of a plurality of electrostatic recording units having an electrophotographic recording print function for use in printers, copiers, etc., and more particularly to a printing apparatus for detecting and correcting relative positional offsets of color images formed by a plurality of removable electrostatic recording units.

2. Description of the Related Art

Up until now, in color printing apparatuses using electrophotographic recording, electrostatic recording units for four colors, black (K), cyan (C), magenta (M) and yellow (Y) have been arranged in tandem in the direction of conveyance of record paper. The electrostatic recording units for four colors form latent images through the optical scanning of photosensitive drums based on image data, develop these latent images with color toners from developing vessels, and thereafter transfer the yellow (Y), magenta (M), cyan (C) and black (K) toner images in the mentioned order and in a superposed manner onto the record paper being conveyed at a certain velocity, the resultant images being finally subjected to a thermal fixation through a fixing device. In case of running short of color toners, the entirety or part of the electrostatic recording units for yellow (Y), magenta (M), cyan (C) and black (K) must be replaced. To this end, the electrostatic recording units are provided with a structure ensuring easy mounting and dismounting with the apparatus cover opened. In the color printing apparatus comprising the electrostatic recording units for Y, M, C and K arranged in tandem in the record paper conveyance direction, on the other hand, the requirement for enhancing the quality of the color printing is to reduce positional offsets of toner images transferred by the electrostatic recording units onto the record paper in motion to thereby enhance the accuracy of color matching. Providing that the resolutions on the record paper in the horizontal scanning direction (the direction orthogonal to the conveyance direction) and in the vertical scanning direction (the direction in which the record paper is conveyed) are respectively 600 dpi, the pixel pitch results in about 42 $\mu$m, and hence the positional offset must be suppressed to 42 $\mu$m or below.

In the case of the conventional tandem type color printing apparatus, however, it was difficult to realize the color matching ensuring the positional offsets less than 42 $\mu$m through the mechanical machining accuracy or assembling accuracy since the removable electrostatic recording units for Y, M, C and K present larger positional offsets than the fixed electrostatic recording units. In Japanese Patent Laid-open Pub. No. Hei8-85236 for instance, to solve this problem, test pattern resist marks are transferred onto the transfer belt at four points on rectangular corners and read by a CCD to detect the amount of positional offsets of detection coordinates of the resist marks relative to previously set absolute reference coordinates, so that upon the output of image data to a laser scanner, the output coordinate positions are corrected on the basis of the amount of offsets detected. However, such conventional positional offset detection and positional offset correction necessitate the detection of the positional offsets of the resist marks relative to the absolute coordinates, on all the electrostatic recording units for yellow (Y), magenta (M), cyan (C) and black (K). In addition, the use of the CCD for the detection of the resist marks leads to extended processing time for positional offset detection and to increased amount of the hardware, resulting in raised production costs. Although it is also conceivable to correct the positional offsets through the mechanical adjustability of the light emitting array, it would be difficult to realize the adjustment capable of suppressing the positional offset to 42 $\mu$m or below. For this reason, the color printing apparatus using the light emitting array has often caused positional offsets as large as 300 $\mu$m for instance, making it impossible to realize the satisfactory printing quality through the superposition of the color components.

SUMMARY OF THE INVENTION

According to the present invention, there is provided an apparatus which includes electrostatic recording units each having an light emitting array and ensures a high precision correction of positional offsets correction through a simple detection of the positional offsets.

The printing apparatus in accordance with the present invention comprises a conveyance mechanism including a belt moving at a certain velocity for conveying record paper in an adhered manner; and a plurality of electrostatic recording units arranged in the direction of conveyance of the record paper for forming a latent image in conformity with image data through optical scanning of a photosensitive drum, to develop the latent image with different color toner components to thereafter transfer the thus developed image onto the record paper on the belt. Such a tandem type printing apparatus of the present invention further comprises a positional offset detection unit and a positional offset correction unit. The positional offset detection unit includes sensors for optically detecting a plurality of resist marks of color toner components transferred onto the belt at predetermined pitches by the plurality of electrostatic recording units, the positional offset detection unit detecting positions of the resist marks from phase differences $\phi$ obtained through Fourier transform of detection signals of the sensors, to detect positional offsets, relative to a reference resist mark of any one color, of the resist marks of the other colors. The positional offset correction unit relatively corrects the plurality of electrostatic recording units other than the electrostatic recording unit associated with the reference image, on the basis of positional offset detection information detected by the positional offset detection unit, so as to eliminate any positional offsets, relative to the reference image, of the other color images.

The positional offset detection unit transfers a plurality of lateral lines and a plurality of slanted lines as the resist marks onto the belt on a color-to-color basis, to detect positions of the lateral lines and positions of the slanted lines from phases obtained through Fourier transform of detection signals of the sensors. In order to detect a positional offset by means of the positional offset detection unit, a single lateral line or slanted line may be transferred onto the belt and then detected by the sensors. However, in case the toner does not lie uniformly on the line or noises are mixed with sensor detection signals, it becomes impossible to accurately detect the position of the line due to the confusion of the position of the line with the noises. Thus, according to the present invention, a plurality of lateral lines and slanted lines for the detection of the positions are transferred onto the belt at a certain pitch to form s striped patterns repeating at a certain period. Then, Fourier transform is applied to detection signals which are obtained by reading the striped patterns using the sensors. This Fourier transform is a discrete Fourier transform in which a cosine Fourier coefficient a and a sine Fourier coefficient b are calculated from sampled raw data and then a phase φ and an amplitude c are obtained. Since the phase φ corresponds to the position of the lateral line or slanted line relative to the predetermined Fourier transform start position with one period 2 π in the Fourier transform being a line pitch interval, the phase φ can be transformed into the line position. As a result of this, accurate detection of the lines is ensured without being affected by the noises even though they are mixed with the sensor detection signals.

The positional offset detection unit transfers the lateral lines in the form of a plurality of straight lines extending in the direction orthogonal to the vertical scanning direction which is the direction of conveyance of the record paper on the belt, the positional offset detection unit transferring the slanted lines in the form of a plurality of straight lines in the direction inclined at 45° relative to the vertical scanning direction. Such an inclination of the slanted lines at 45° enables the position detected in the vertical scanning direction coincident with the belt conveyance direction to be utilized intactly as the position in the horizontal scanning direction orthogonal to the belt conveyance direction. The positional detection unit sets the length of a range in which a resist pattern is transferred in the Fourier transform direction coincident with the vertical scanning direction to be integer times the pitch intervals of the plurality of resist patterns. The positional offset detection unit transfers a premark on the leading edge side of each resist mark consisting of the lateral lines and slanted lines and reads each resist mark of the lateral lines and slanted lines for Fourier transform over a predetermined Fourier calculation range having a sensor read start position (Fourier transform start position) apart a predetermined distance from the center position of the premark. The positional offset detection unit prints the reference resist mark by means of the electrostatic recording unit associated with a color having the highest contrast, to detect information on positional offsets of resist marks transferred by the electrostatic recording units associated with the other colors. The plurality of electrostatic recording units are units for printing black, cyan, magenta and yellow color images, and a black resist mark formed by the electrostatic recording unit for black is employed as the reference resist mark for detecting positional offsets relative thereto of resist marks formed by the electrostatic recording units for cyan, magenta and yellow.

The positional offset detection unit transfers resist marks consisting of a plurality of lateral lines and a plurality of slanted lines onto the belt at two regions on the scanning initiation end side and on the scanning termination end side in the horizontal scanning direction orthogonal to the direction of conveyance of the record paper, and Fourier transforms sensor detection signals of the resist marks to detect for each color component the lateral line positions at two points on right and left sides and the slanted line positions at two points on right and left sides, to consequently detect on the basis of the four detection points correction values $\Delta x$ in the horizontal scanning direction, correction values $\Delta y$ in the vertical scanning direction and skew correction values $\Delta z$ relative to the black reference of the other color components. The positional offset detection unit multiplies an average value of differences of right and left lateral line positions relative to right and let slanted line positions of black component with a conversion ratio (Ln/Ls) of a correction unit amount Ln in the horizontal scanning direction to a sampling pitch Ls in the vertical scanning direction, to obtain an absolute position Xk for the black component in the horizontal scanning direction. That is, Absolute position Xk in horizontal scanning direction=[{(left slanted line position P13–left lateral line position P11}) +(right slanted line position P14)–(right lateral line position P12)}/2]) ×(correction unit amount Ln/sampling pitch Ls)

The positional offset detection unit then multiplies an average value of differences of right and left lateral line positions relative to right and left slanted line positions of the other color components with a conversion ratio (Ln/Ls) of a correction unit amount Ln in the horizontal scanning direction relative to a sampling pitch Ls in the vertical scanning direction, and subtracts from the product the absolute position Xk of black component in the horizontal scanning direction, to obtain correction values $\Delta x$ for the other color components in the horizontal scanning direction. That is, for each of the colors C, M and Y, use is made of Correction value $\Delta x$ in horizontal scanning direction=[{(left slanted line position Pn3)–(left lateral line position Pn1]+(right slanted line position Pn4)–(right lateral line position Pn2)}/2]× (correction unit amount Ln/sampling pitch Ls)–(absolute position Xk in horizontal scanning direction)

The positional offset detection unit subtracts lateral line positions of black from lateral line positions of the other color components, and further subtracts from the difference values obtained by dividing transfer intervals between black lateral lines and the other color lateral lines by a belt conveyance velocity, to finally obtain correction values $\Delta y$ of the other color components than black in the vertical scanning direction. That is, CMY correction value $\Delta y$ in vertical scanning direction=(CMY lateral line position Pn1)–(K left lateral line position P11)–(K–CMY inter-transfer distance)/(belt velocity Vb)

The positional offset detection unit obtains a skew absolute value Zk of a black reference image in the form of a difference between right and left black lateral line positions, and obtains skew correction values $\Delta z$ of the other color images by subtracting the skew absolute value Zk of black from differences between the right and left lateral line positions of the other color components. That is, CMY skew correction value $\Delta z$=(CMY right lateral line position Pn2)–(CMY left lateral line position Pn1)–(K skew absolute value Zk)

When the image data transferred from the host apparatus are expanded into pixel data and stored into the image memory, the positional offset correction unit modifies the write address so as to correct the offset of the object image relative to the reference image upon the printing operation on the basis of the positional offset correction values from the positional offset detection unit. The positional offset correction unit calculates the amount of offset in the vertical scanning direction of pixel positions on a vertical scanning line from the correction values $\Delta x$ in the horizontal scanning direction, the correction values $\Delta y$ in the vertical scanning direction and the skew correction values $\Delta z$ detected by the positional offset detection unit, the positional offset correction unit correcting write addresses in the vertical scanning direction of the electrostatic recording units to positions in the opposite direction allowing a cancellation of the amount of offset, to write image data into image memories.

The sensor for reading the resist marks includes a condensing lens through which a light from a predetermined laser diode is condensed and is irradiated onto a belt transfer surface as a spot light of the order of several ten microns; and light receiving elements arranged at a predetermined output angle for receiving scattered light as a result of the irradiation of the spot light on the toner components transferred onto the belt transfer surface, allowing the sensor to issue a sensor detection signal. For use of the sensors, the back of the belt surface on which is irradiated the spot light from the laser diode is provided with a cavity for suppressing the scattered light from the back side of the belt to thereby reduce the noises.

The above and other objects, features and advantages of the present invention will become more apparent from the following detailed description with reference to the accompanying drawings.

BRIEF DESCRIPTION OF THE DRAWINGS

FIGS. 4A and 4B are block diagrams of a configuration of the hardware of the present invention;

FIG. 17 is a flowchart of the positional offset detection processing executed by the positional offset detection unit of FIG. 7;

FIG. 21 is an explanatory diagram of positional offset correction tables created from the positional offset detection information of the present invention.

DETAILED DESCRIPTION OF THE PREFERRED EMBODIMENTS

Apparatus Configuration

Figure 1:
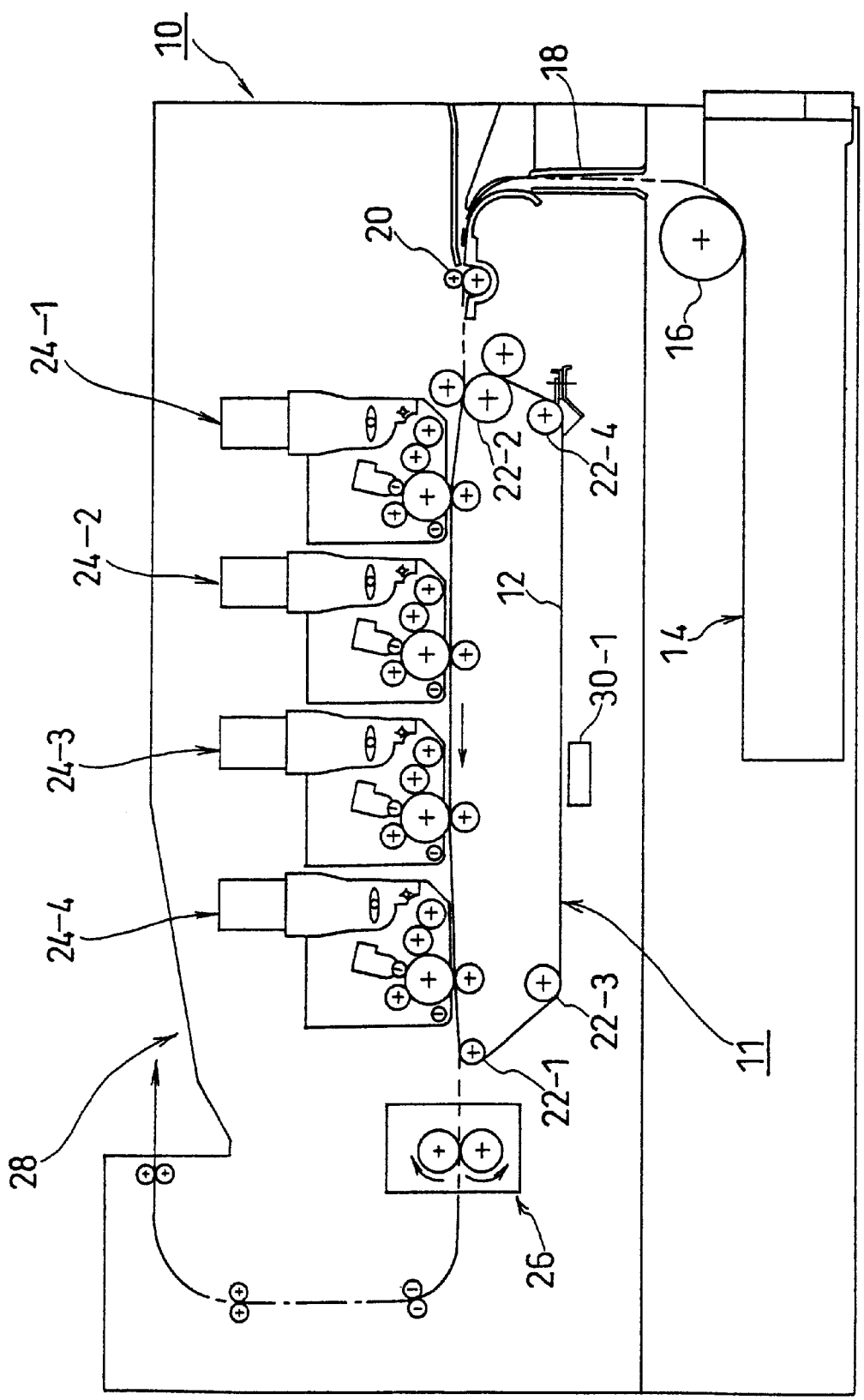
FIG. 1 is an explanatory diagram of an internal structure of a body of the apparatus in accordance with the present invention.

FIG. 1 illustrates an internal structure of a printing apparatus in accordance with the present invention. The apparatus comprises a body 10 which accommodates therein a conveyance belt unit 11 for conveying record media, for instance, sheets of record paper. The conveyance belt unit 11 includes an endless belt 12 rotatably provided and made of a dielectric material having light transmission properties, for instance, a suitable synthetic resin material. The endless belt 12 runs around four rollers 22-1, 22-2, 22-3 and 22-4. The conveyance belt unit 11 is removably provided in the apparatus body 10. The roller 22-1 serves as a driving roller. By means of a driving mechanism (not shown), the driving roller 22-1 drives the endless belt 12 so as to allow it to run at a certain speed clockwise as indicated by an arrow. The driving roller 22-1 serves also as an AC eliminating roller for eliminating electric charges from the endless belt 12. The roller 22-2 serves as a driven roller. The driven roller 22-2 serves also as an electrifying roller for imparting electric charges to the endless belt 12. The rollers 22-3 and 22-4 serve as guide rollers and are arranged in vicinity of the driving roller 22-1 and the driven roller 22-2, respectively. An upper running portion of the endless belt 12 between the driven roller 22-2 and the driving roller 22-1 forms a record paper moving path. The sheets of record paper are stacked within a hopper 14 and are picked up one by one from the uppermost sheet by means of a pickup roller 16. The thus picked-up record paper passes through a record paper guide passage 18 and is delivered by a pair of record paper feed rollers 20 from the driven roller 22-2 side of the endless belt 12 onto the record paper moving path defined by the upper portion of the belt. After the passage through the record paper moving path, the record paper is discharged through the driving roller 22-1. Since the endless belt 12 is electrified by the driven roller 22-2, the record paper electrostatically adheres to the endless belt 12 when it is delivered from the driven roller 22-2 side onto the record paper moving path, thereby preventing any positional offsets of the sheets of record paper in motion. On the other hand, since the driving roller 22-1 serves as a destaticizing roller, electric charges are eliminated from the endless belt 12 at its portion in contact with the driving roller 22-1. This allows the record paper to be cleared of electric charges when passing through the driving roller 22-1, thereby ensuring an easy detachment for discharge of the record paper from the endless belt 12 without being caught by a lower portion of the belt. The apparatus body 10 accommodates therein four electrostatic recording units 24-1, 24-2, 24-3 and 24-4 which are arranged in tandem in the sequence of Y, M, C and K from the upstream toward the downstream side along the record paper moving path defined by the upper portion of the endless belt 12 between the driven roller 22-2 and the driving roller 22-1. The electrostatic recording units 24-1 to 24-4 have the same structure except that they use as a developer a yellow toner component (Y), a magenta toner component (M), a cyan toner component (C) and a black toner component (K), respectively. For this reason, the electrostatic recording units 24-1 to 24-4 transfer and record in sequence a yellow toner image, a magenta toner image, a cyan image and a black toner image in a superposed manner on the record paper moving along the record paper moving path defined by the upper portion of the endless belt 12, to thereby form a a full-color toner image.

Figure 2:
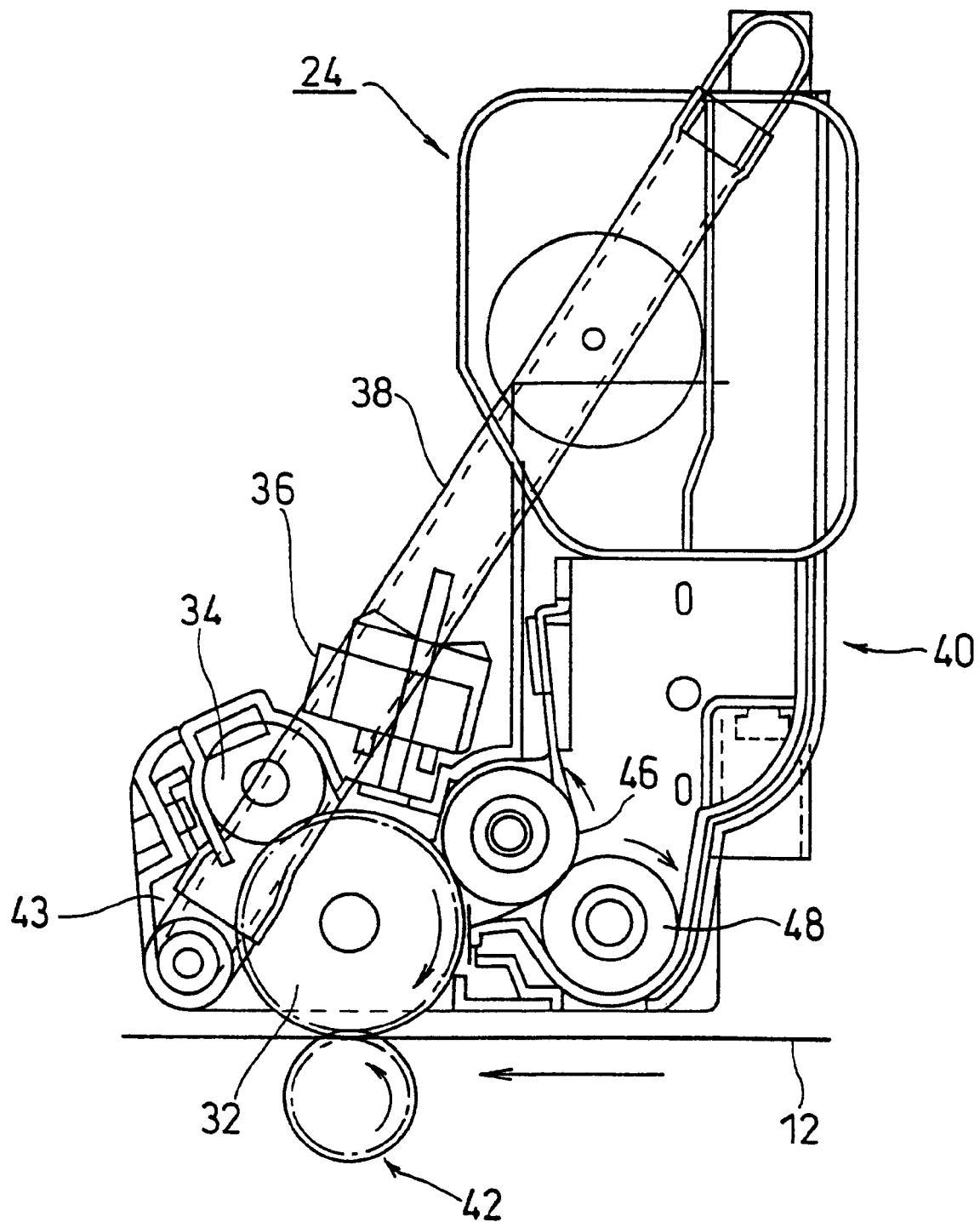
FIG. 2 is a sectional view of an electrostatic recording unit of FIG. 1.

FIG. 2 illustrates one of the electrostatic recording units 24-1 to 24-4 of FIG. 1 in an exclusive manner. The electrostatic recording unit 24 includes a photosensitive drum 32 which is rotated clockwise upon the recording action. Above the photosensitive drum 32 is disposed a front electrifier 34 in the form of a corona electrifier or a scorotron electrifier for instance, which front electrifier 34 charges a rotational surface of the photosensitive drum 32 with uniform electric charges. Opposed to an electrified area of the photosensitive drum 32 is an LED array 36 serving as an optical writing unit, which emits a light for scanning to write an electrostatic latent image thereon. The LED array 36 consists of light emitting elements, which are aligned in the horizontal scanning direction and are driven on the basis of gradation values of pixel data (dot data) expanded from image data provided as print information from a computer, a word processor, etc. For this reason, the electrostatic latent image is written in the form of a dot image. The electrostatic latent image written on the photosensitive drum 32 is electrostatically developed by a developing vessel 40 disposed above the photosensitive drum 32 into an electrified toner image made of a predetermined color toner. The electrified toner image on the photosensitive drum 32 is electrostatically transferred on the record paper by means of an electrically conductive transfer roller 42 disposed beneath. The electrically conductive transfer roller 42 is juxtaposed with the photosensitive drum 32 with a minute gap through which the endless belt 12 passes, to impart electric charges having a polarity opposite to that of the electrified toner image to the record paper being conveyed by the endless belt 12. Thus, the electrified toner image on the photosensitive drum 32 is electrostatically transferred onto the record paper. After the transfer process, the surface of the photosensitive drum 32 still carries thereon toner residues which remain adhered without being transferred onto the record paper. These toner residues are removed from the photosensitive drum 32 by a toner cleaner 43 disposed on the downstream side of the record paper moving path. The thus removed toner residues are fed back to the developing vessel 40 by way of a screw conveyor, to reuse as the developing toner.

Referring again to FIG. 1, during the passing through the record paper moving path of the endless belt 12 between the driven roller 22-2 and the driving roller 22-1, the record paper is subjected to the transfer through the superposition of the toner images of four colors Y, M, C and K by the electrostatic recording units 24-1 to 24-4 to form a full color image thereon, and then it is fed from the driving roller 22-1 side to a heat roller type thermal fixing device 26 for performing a thermal fixation of the full color image onto the record paper. After the completion of the thermal fixation, the record paper passes through the guide rollers and then is stacked in a stacker 28 provided on the upper portion of the apparatus body. Opposed to the lower belt surface of the endless belt 12 of the conveyance belt 10 are a pair of sensors 30-1 and 30-2 which are arranged in a direction orthogonal to the belt moving direction, with only the sensor 30-1 closer to the viewer being visible in the state of FIG. 1. These sensors 30-1 and 30-2 are used to optically read resist marks for the detection of positional offsets, which marks are transferred onto the endless belt 12 upon the detection of the positional offsets in accordance with the present invention.

Figure 3:
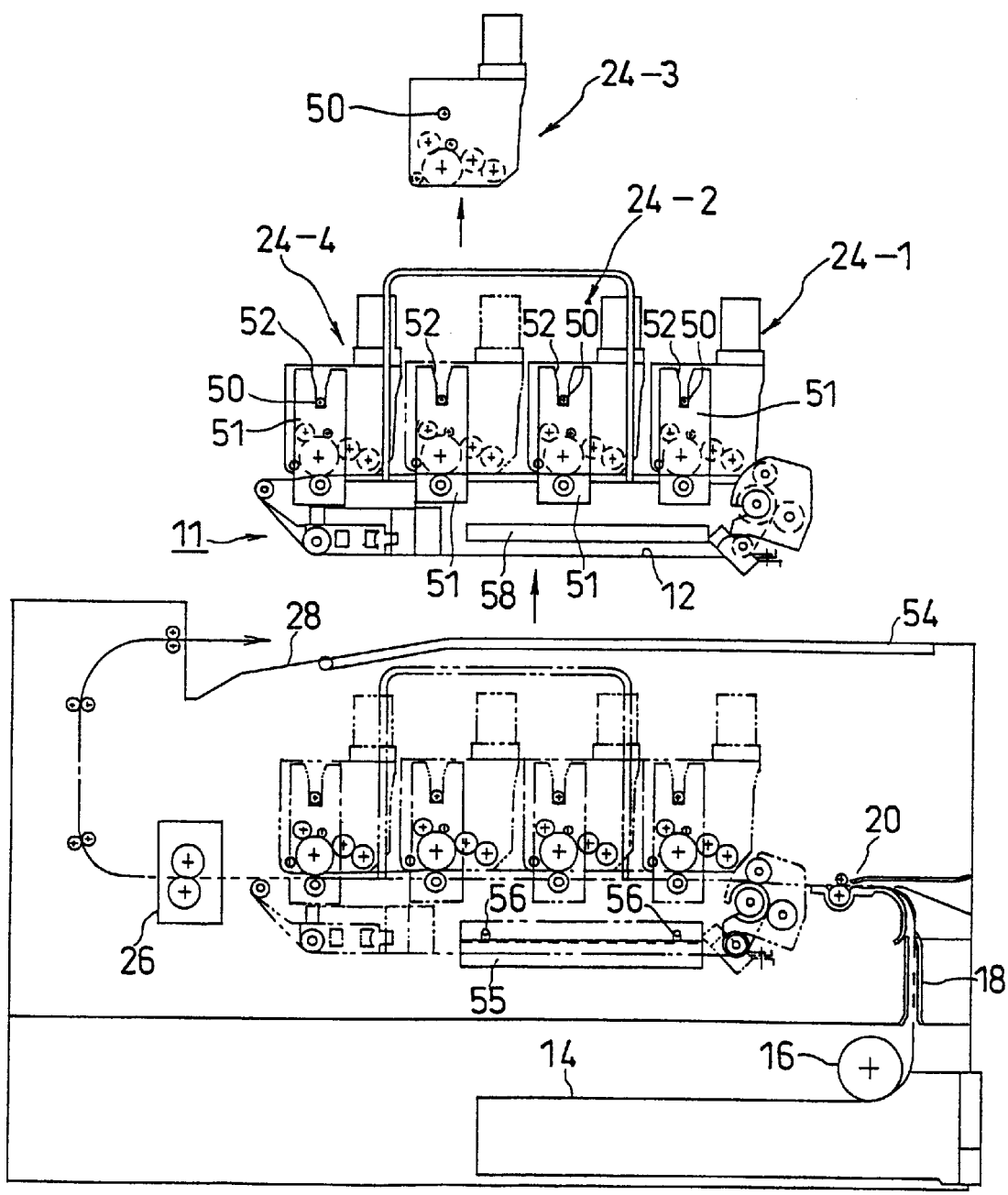
FIG. 3 is an explanatory diagram of the removed state of a conveyance belt unit and the electrostatic recording unit df FIG. 1.

FIG. 3 illustrates the conveyance belt unit 11 housed in the apparatus body 10 of FIG. 1 and now shown taken out in an exclusive manner, with the attachment/detachment structure of the electrostatic recording units 24-1 to 24-4 mounted on the conveyance belt unit 11. The top of the apparatus body 10 is provided with a cover 54 which is freely opened and closed on a pivot at the left-hand side. Within the interior of the apparatus body 10 is arranged a frame 55 having pins 56 at two points on its upper potion. On the other hand, the side surface of the conveyance belt unit 11 shown taken out above is provided with a frame 58 confronting the frame 55 on the apparatus body 10 side and having pin holes at positions corresponding to the pins 56. By virtue of this structure, the conveyance belt unit 11 may be pulled up after opening the cover 54 so that it can be drawn upward from the pins 56 on the apparatus body 10 side. The electrostatic recording units 24-1 to 24-4 are mounted on the conveyance belt unit 11 in such a manner that pins provided on the side surfaces of the electrostatic recording units 24-1 to 24-4 are fitted into attachment grooves 52 opening on the top of attachment plates 51 arranged on both side surfaces of the conveyance belt unit 11. The attachment groove 52 consists of an upper V-shaped opening and a lower straight groove continuous with the opening and having the same width as that of the pins 50 so that the pins 50 can be aligned with the attachment grooves 52 and pushed into the lower grooves so as to ensure precise positioning at predetermined locations on the conveyance belt unit 11. In cases where it is desired that the electrostatic recording units 24-1 to 24-4 be replenished with toner or subjected to maintenance, they can be easily dismounted from the unit 11 by pulling up as the electrostatic recording unit 24-3 for instance.

Hardware Configuration and Function

Figure 4B:
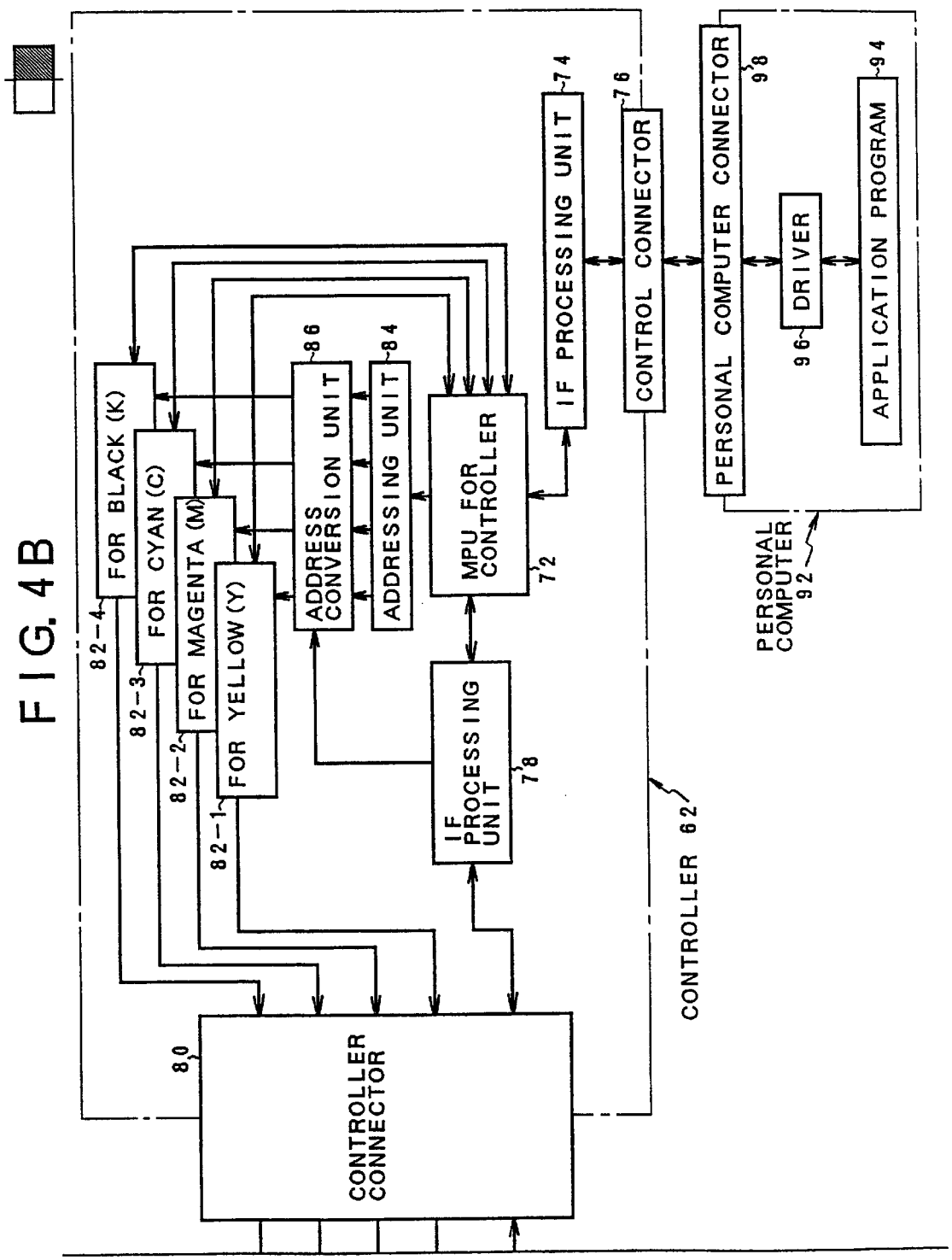

FIGS. 4A and 4B are block diagrams of a hardware configuration of the printing apparatus in accordance with the present invention. The hardware of the present invention is constituted by an engine 60 and a controller 62. The engine 60 comprises a mechanical controller 64 which performs actions controlling print mechanics section including the conveyance belt unit 11 and the electrostatic recording units 24-1 to 24-4 of FIG. 1. Associated with the mechanical controller 64 is an MPU 66 for sensor processing which executes positional offset detection processing in accordance with the present invention. The MPU 66 for sensor processing receives detection signals from the pair of sensors 30-1 and 30-2 disposed below the endless belt 12. The mechanical controller 64 is connected via an engine connector 70 to the controller 62 side. The print mechanics provided in the engine comprise the endless belt 12 and LED arrays 36-1, 36-2, 36-3 and 36-4 shown taken out and provided on the Y, M, C and K electrostatic recording units, respectively. The controller 62 comprises an MPU 72 for controller, which is connected via an interface processing unit 74 and a controller connector 76 to a personal computer 92 for instance serving as a host apparatus. The personal computer 92 includes a driver 96 for the print processing of color image data provided from any application program 94, with the driver 6 being connected via a personal connector 98 to the control connector 76 of the controller 62. The MPU 72 for controller of the controller 62 is provided with image memories 82-1, 82-2, 82-3 and 82-4 for expanding Y, M, C and K image data transmitted from the personal computer 92 into pixel data (dot data) for storage. On the other hand, the MPU 72 for controller is connected via an interface processing unit 78 and a controller connector 80 to the engine 60, with the interface processing unit 78 receiving positional offset information detected by the engine 60 side, thereby allowing the pixel data on each image expanded into the image memories 82-1 to 82-4 to be subjected to positional offset correction. The MPU72 for controller is provided with an addressing unit 84 for performing addressing when each color pixel data are expanded in the image memories 82-1 to 82-4. The addressing unit 84 is followed by an address conversion unit 86 which performs address conversion for positional offset correction on the basis of positional offset information provided via the interface processing unit 78 from the engine 60 side.

Figure 5:
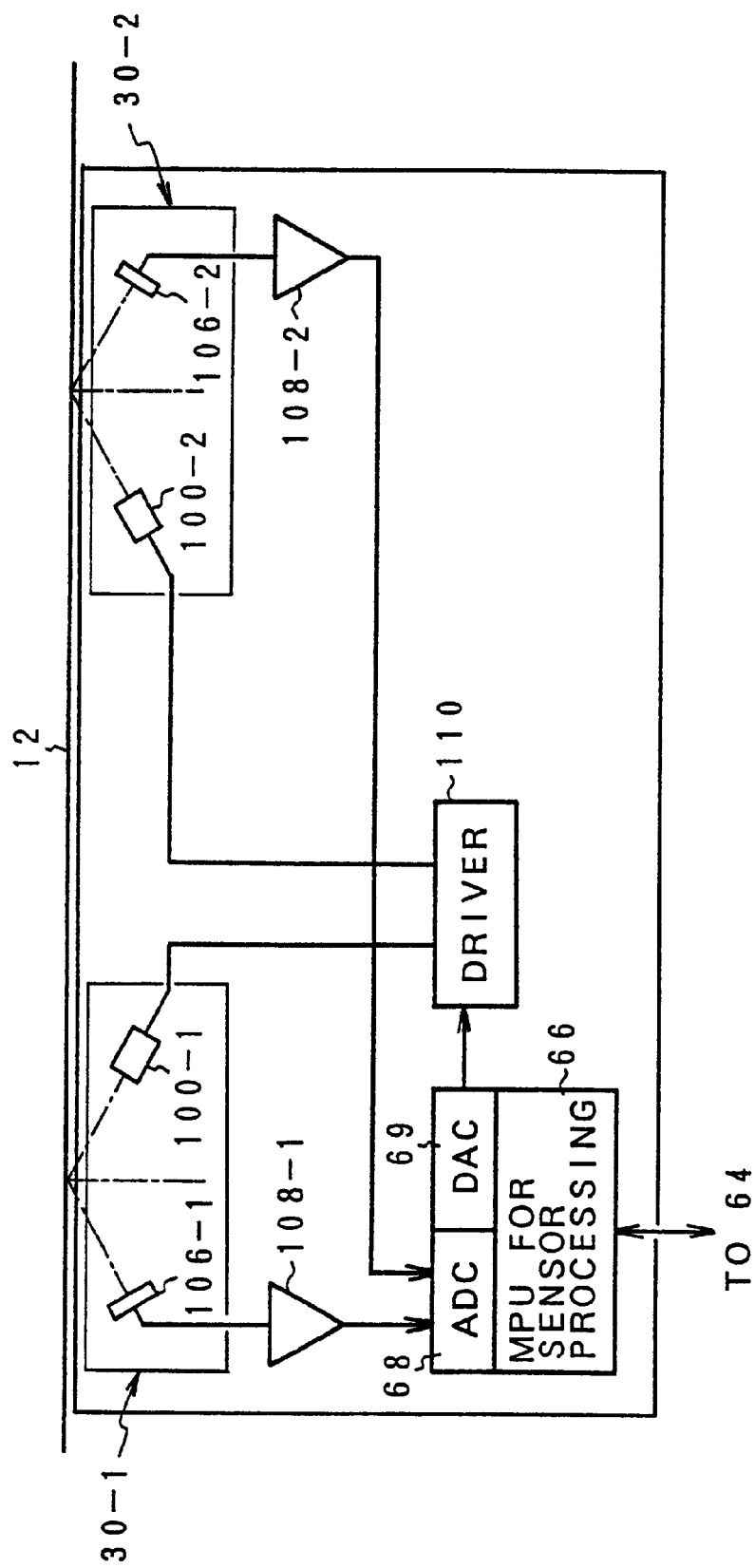
FIG. 5 is an explanatory diagram of an arrangement of sensors for detecting resist marks transferred onto a belt.

FIG. 5 is a cross section taken along a line orthogonal to the direction of conveyance of the endless belt 12, showing the structure of arrangement of the sensors 30-1 and 30-2 and a drive circuit unit provided on the engine 60 side of FIGS. 4A and 4B. The two sensors 30-1 and 30-2 are juxtaposed underneath the endless belt 12 in the direction orthogonal to the belt conveying direction. The sensors 30-1 and 30-2 are provided respectively with laser diodes 100-1 and 100-2 having a wavelength of 780 nm and respectively with photodiodes 106-1 and 106-2. The laser diodes 100-1 and 100-2 are driven for light emission by a driver 110. Light receiving signals from the photodiodes 106-1 and 106-2 are amplified by amplifiers 108-1 and 108-2 and then fetched through an AD converter 68 into the MPU 77 for sensor processing. The driver 110 is operated in response to a signal from a DA converter provided in the MPU 66 for sensor processing, to drive the laser diodes 100-1 and 100-2 for light emission.

Figure 6:
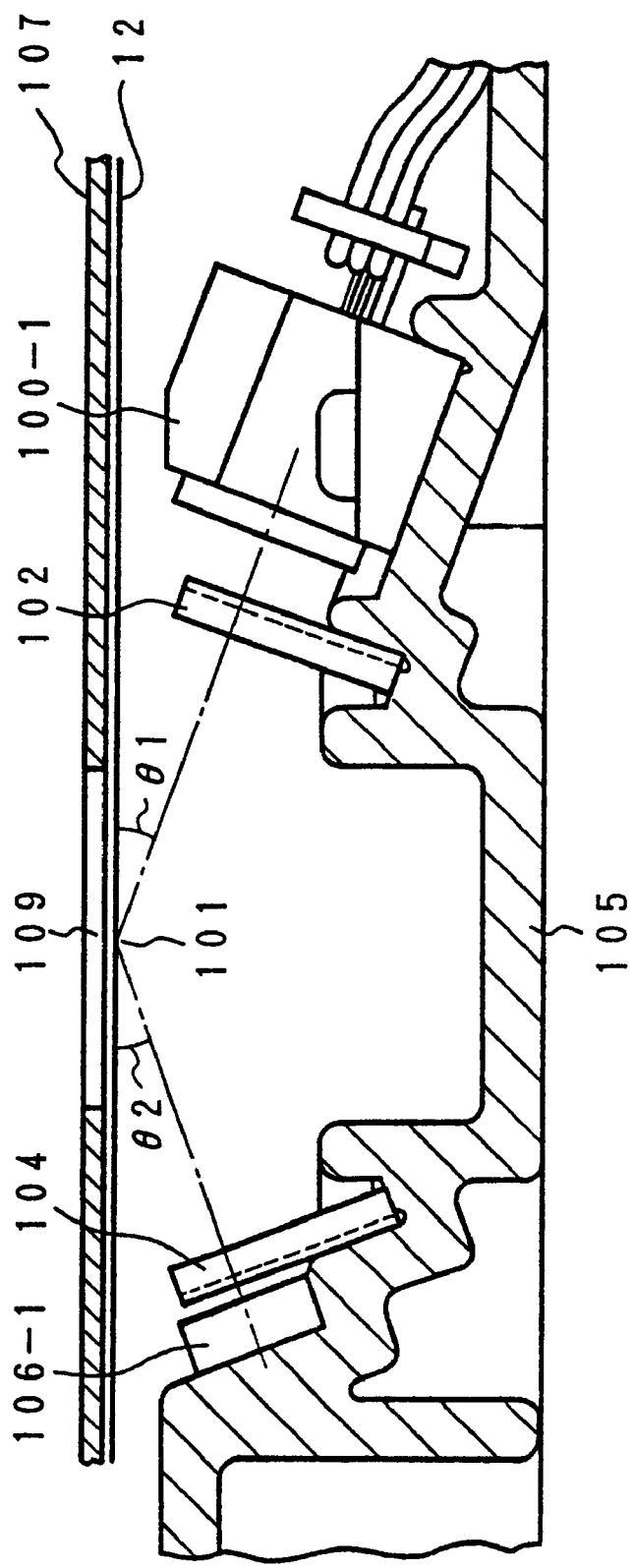
FIG. 6 is an explanatory diagram of a structure of the sensor of FIG. 5.

FIG. 6 illustrates a specific structure of the sensor 30-1 of FIG. 5 by way of example. The laser diode 100-1 is disposed on the right-hand side of a housing 105. In front of the laser diode 100-1 is disposed an image forming lens 102 with a collimator, through which lens 102 beams of light from the laser diode 100-1 are gathered to form a minute beam spot on the surface of the belt 12 at an image forming position 101 with an incident angle θ1. The diameter of the beam spot of laser beams irradiated onto the image forming position 101 is restricted to for instance of the order of several tens of μm. The photodiode 106-1 is disposed by way of a condensing lens 104 in the direction of the optical axis with an output angle θ2 from the image forming position 101 on the belt 12. In the case of the positional offset detection in accordance with the present invention, resist marks using K, C, M and Y toners for the position detection are transferred onto the surface of the belt 12 and are detected by the sensors 30-1 and 30-2. In this case, the resist marks transferred onto the surface of the belt 12 are unfixed toners and have no or little gloss, which are therefore impossible to optically detect from the reflection. Thus, in the case of the sensors 30-1 and 30-2 of the present invention, a minute beam spot from the laser diode 100-1 is irradiated on the unfixed transfer toner so that resultant scattered light is received by the photodiode 106-1. The endless belt 12 is guided along a guide plate 107 positioned on its reverse side. However, in case the guide plate 107 is positioned behind the detection position 101 on which a beam spot from the laser diode 100-1 is formed, the beam spot irradiated on the translucent belt 12 may be reflected by the guide plate 107 positioned on the reverse side, allowing scattered light to enter the photodiode 106-1, resulting in noise light. Thus, the guide plate 107 positioned behind the endless belt 12 is provided with a through hole 109 formed in a portion around the detection position 101 where the scattered noise light may occur, to thereby prevent the noise light from occurring as the result of the reflection on the guide plate 107.

Figure 7:
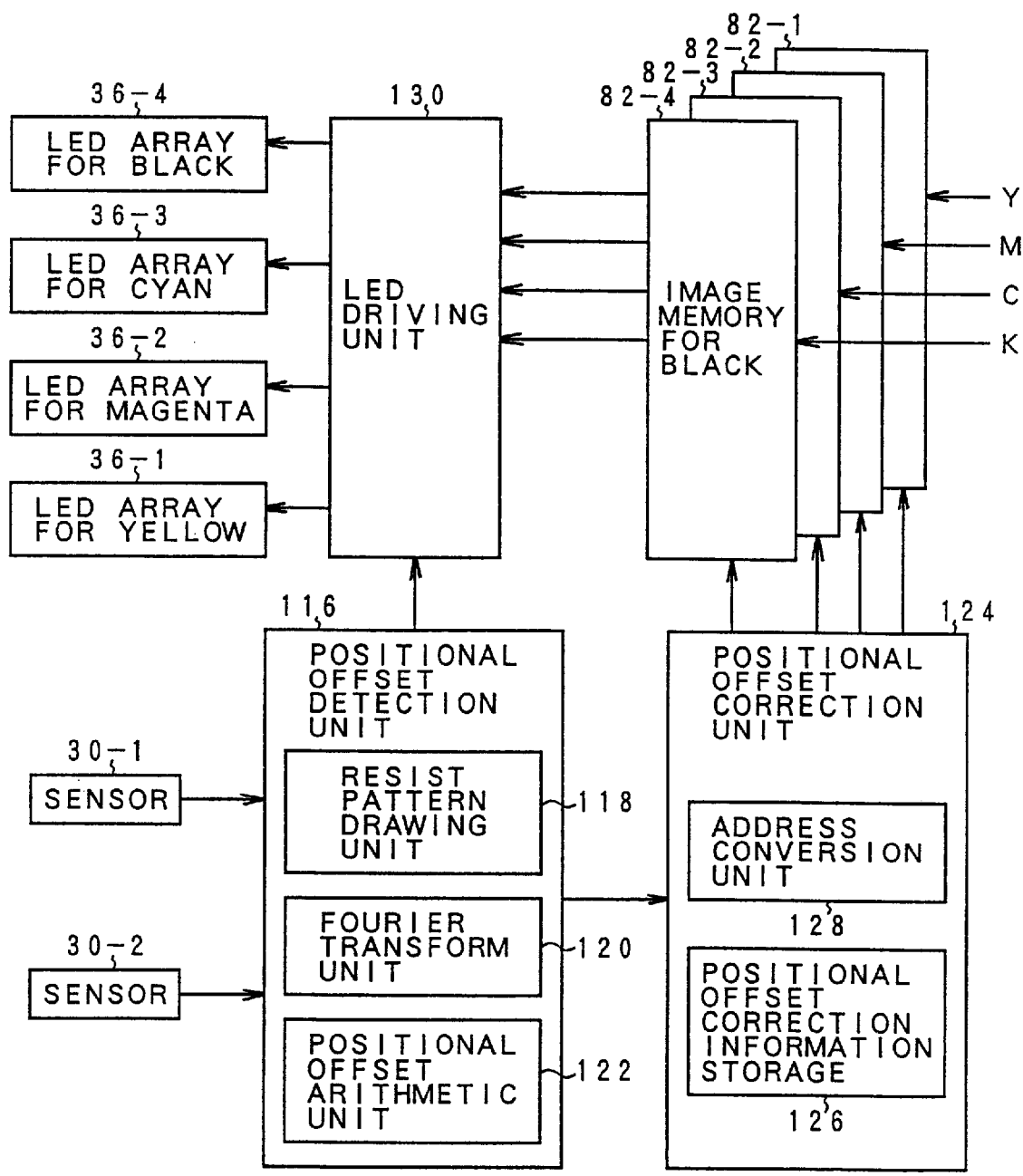
FIG. 7 is a block diagram of a processing function of the present invention
Figure 8:
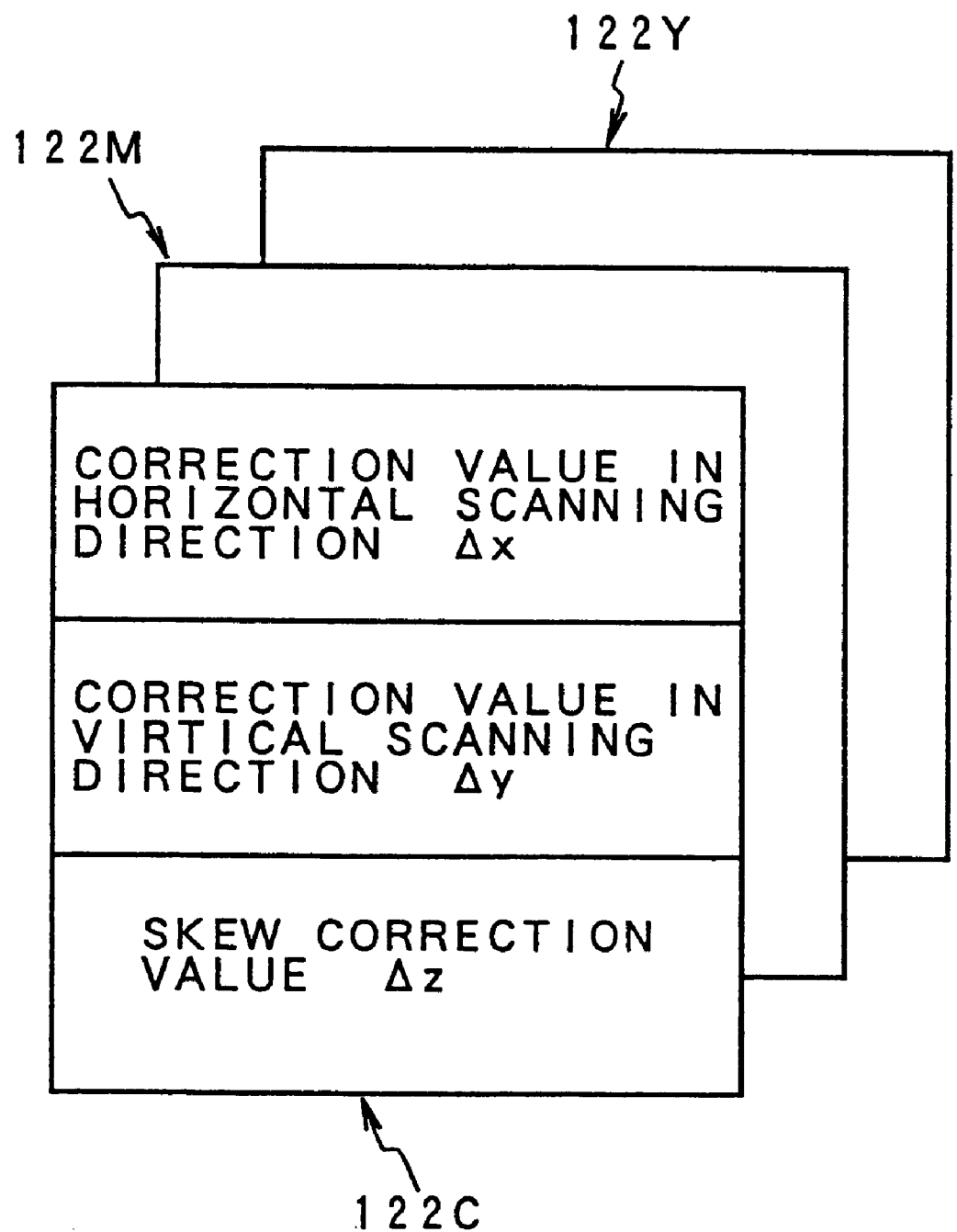
FIG. 8 is an explanatory diagram of tables for storing therein positional offset correction amounts.

FIG. 7 is a function block diagram of the printing apparatus in accordance with the present invention, which is constituted by the hardware of FIGS. 4A and 4B, the apparatus basically having two functions of a positional offset detection unit 116 and a position offset correction unit 124. The function of the positional offset detection unit 116 is implemented by the MPU 66 for sensor processing provided in the engine of FIGS. 4A and 4B. The function of the positional offset correction unit 124 is implemented by the MPU 72 provided in the controller 62 of FIGS. 4A and 4B. The positional detection unit 116 receives detection signals from the sensors 30-1 and 30-2 provided underneath the endless belt 12 in the engine 60 of FIGS. 4A and 4B. The positional offset detection unit 116 includes a resist pattern drawing unit 118, a Fourier transform unit 120 and a positional offset arithmetic unit 122. By way of an LED driving unit 130 upon the detection of positional offsets, the resist pattern drawing unit 118 allows LED arrays 36-1 to 36-4 for Y, M, C and K to draw the resist patterns for positional offset detection on the endless belt 12. These resist patterns for positional offset detection are transferred onto two points, that is, the leading end and the trailing end of a scanning range in the horizontal scanning direction orthogonal to the conveyance direction of the endless belt 12, which are detected by the sensors 30-1 and 30-2, respectively. In the case of the positional offset detection of the present invention, employed as a reference image is a print image of K having the highest contrast among the four colors Y, M, C and K, so that there are detected positional offsets of the remaining Y, M and C print images relative to the K reference image. More specifically, the resist pattern drawing unit 118 holds print information on resist marks having patterned geometries which will be made apparent in the following description, and it uses the resist mark print information to parallel drive for instance the LED arrays 36-1 to 36-4 for four colors Y, M, C and K, to thereby transfer the resist marks onto the endless belt 12. The information on the resist marks held by the resist mark drawing unit 118 may be in the form of bit map patterns, but preferably in the form of vector information, which is expanded into bit map data by the LED driving unit 130 for printing. On the basis of the detection information on the resist marks of the four colors Y, M, C and K detected by the sensors 30-1 and 30-2, the Fourier transform unit 120 performs a Fourier transform to obtain Fourier coefficients a and b, and detects a phase φ from the Fourier coefficients a and b and further detects the positions of the resist marks from the phase φ. The positional offset arithmetic unit 122 operates correction values from the positional offsets of the resist marks of the other colors Y, M and C relative to the reference black resist marks having the highest contrast. The correction values to be obtained by the positional offset arithmetic unit 122 are correction values Δx of the other colors C, M and Y in the horizontal scanning direction relative to the reference absolute position of black K in the horizontal scanning direction, correction values Δy in the vertical scanning direction relative to the reference K, and skew correction values Δz representative of the inclination of the other colors C, M and Y in the vertical scanning direction relative to the reference absolute skew value Xk of the black K. The respective correction values calculated by the positional offset arithmetic unit 122 are stored as shown in FIG. 8 for instance in the form of a table 122C for cyan, a table 122M for magenta and a table 122Y for yellow.

The positional offset correction unit 124 of FIG. 7 includes a positional offset correction information storage unit 126 and an address conversion unit 128. The positional offset correction information storage unit 126 stores correction information based on the positional offset correction values of FIG. 8 detected by the positional offset detection unit 116. The address conversion unit 128 executes an address conversion for the positional offset correction upon the expansion into pixel data in the image memories 82-1 to 82-4, on the basis of the positional offset correction information stored in the positional offset correction information storage unit 126. In order to implement the function of this address conversion unit 128, the controller unit 62 of FIGS. 4A and 4B is provided with the dedicated address conversion unit 86.

Figure 9:
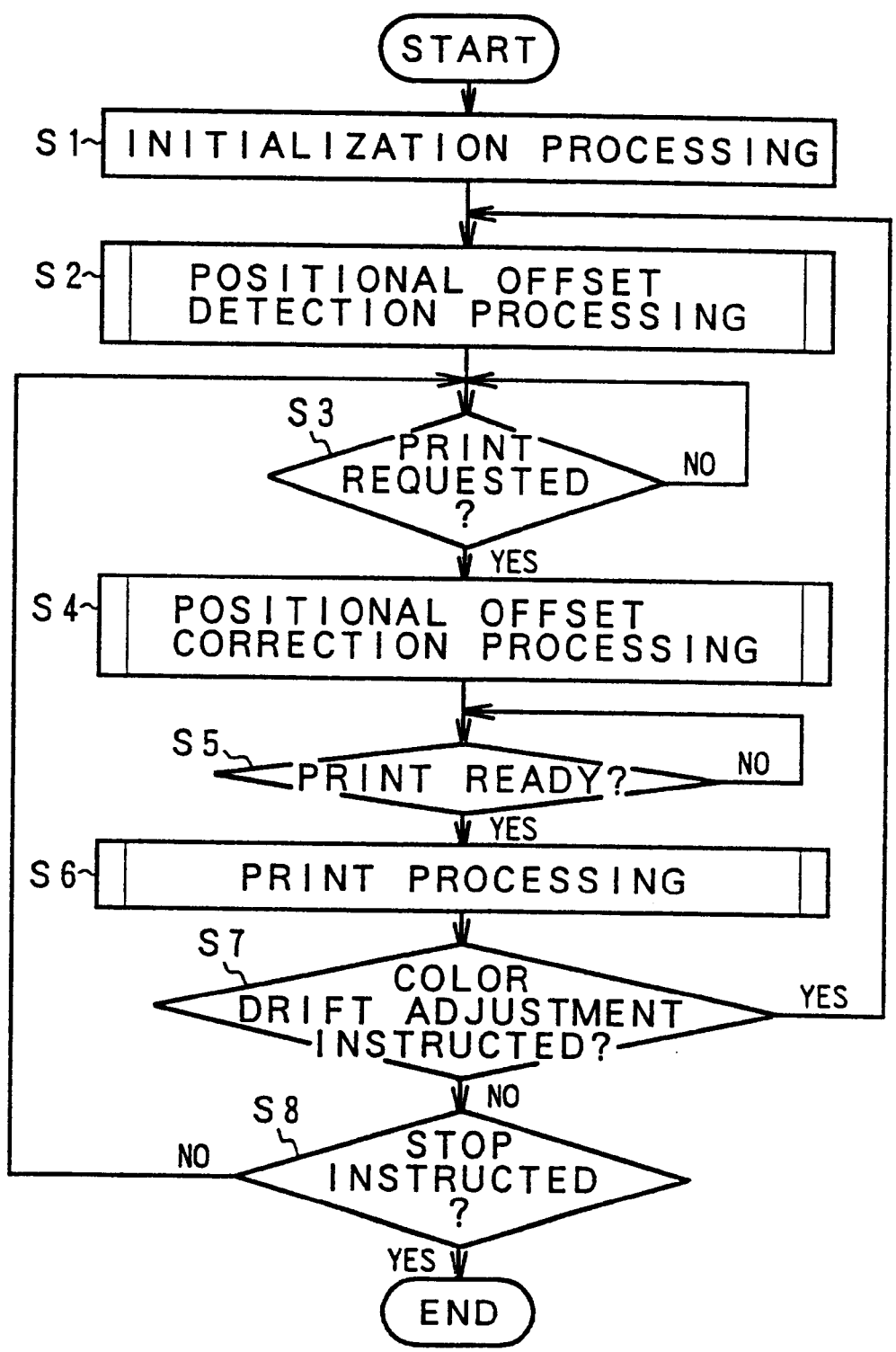
FIG. 9 is a flowchart of general print processing in accordance with the present invention.

FIG. 9 is a general flowchart of the print processing action executed in the printing apparatus of the present invention equipped with the functions of FIG. 7. When the apparatus is first activated, predetermined initialization processing is carried out in step S1, with the initialization processing including positional offset detection processing in step S2. After the completion of the positional offset detection processing in step S2, a check is made in step S3 to see if a print request has been issued from a host personal computer. If the print request has been issued, then the procedure advances to step S4 in which positional offset correction processing is carried out upon the expansion in the image memories of image data transmitted from the personal computer. It is then confirmed instep S5 that a printing operation is ready on the engine 60 side, and in step S6 the printing processing by the engine 60 is carried out. During the processing, a check is made in step S7 to see if a color drift adjusting instruction has been issued, and if the color drift adjusting instruction has been issued, the procedure goes back to step S2 to again perform the same positional offset detection processing as that upon the activation. The color drift adjusting instruction in step S7 includes a manual instruction by the operator and an instruction based on a command from the host personal computer. The positional offsets are attributable to mechanical factors of the electrostatic recording unit provided in the engine unit 60 and depend on the environment temperature within the apparatus. Thus, the elapsed time after the activation may be monitored so that the positional offset detection processing in step S2 is automatically carried out each time the time in accordance with a previously set time schedule elapses. With regard to the time schedule in this case, the time interval of execution of the positional offset detection is shortened due to a large variation in temperature within the apparatus immediately after the supply of electric power, whereas the time interval of execution of the positional offset detection is elongated accordingly as the elapsed time after the supply of power increases.

Positional Offset Detection

Figure 10:
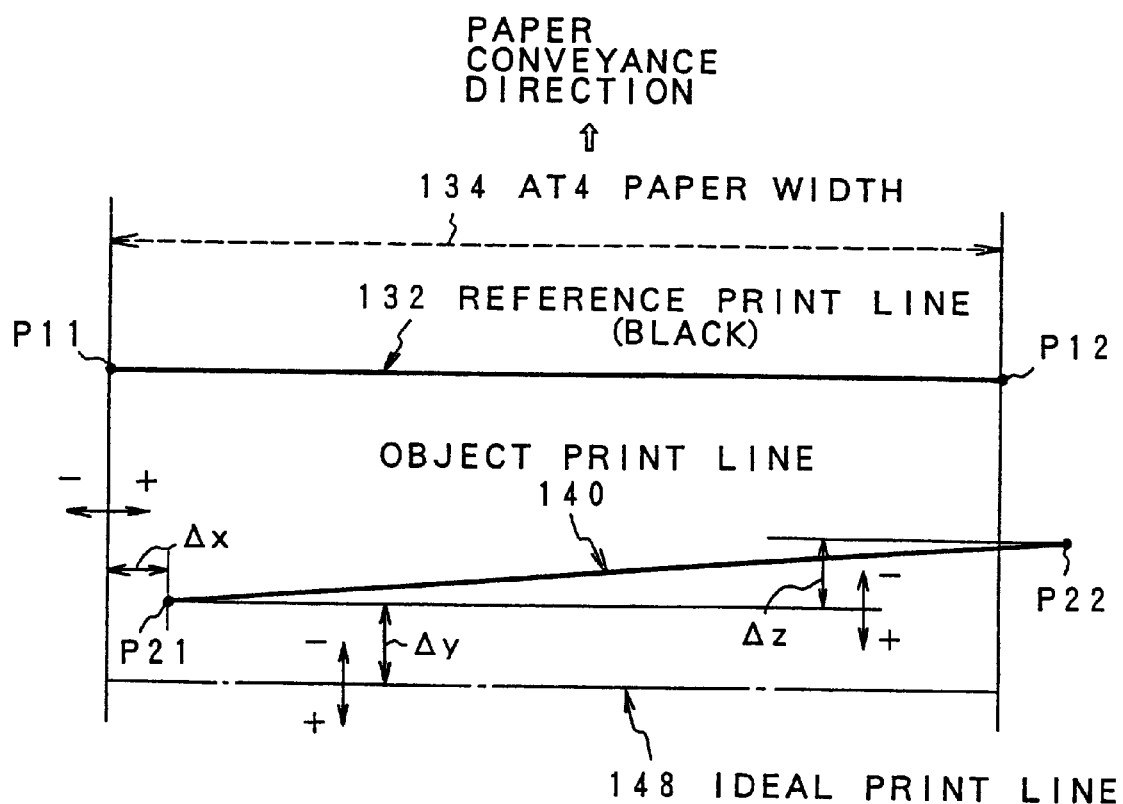
FIG. 10 is an explanatory diagram of a principle of detection of the positional offsets.

FIG. 10 illustrates a principle of the detection of positional offsets in object images of the other colors Y, M and C by the positional offset detection unit 116 of FIG. 7, with the reference image of black K having the highest contrast, by way of the example of the positional offset detection of the object image of cyan C. In this case, a reference print line 132 is a print line of black K having the AT4 paper width orthogonal to the paper conveyance direction. Relative to an ideal print line 148 parallel to the reference print line 132, a printed cyan C object print line 140 is positionally offset due to for instance mechanical offsets of the C electrostatic recording unit relative to the black K electrostatic recording unit. Let P11 and P12 be start and end points on the reference line 132, respectively, and let P21 and P22 be a start point on the object print line 140 where the positional offset starts. and an end point where it terminates, respectively, then the positional offset of the object print line 140 relative to the ideal print line 148 can be defined by three components, that is, a positional offset correction value $\Delta x$ indicative of a positional offset of the start point P21 in the horizontal scanning direction, a vertical scanning direction positional offset correction value $\Delta y$ of the point P21 in the vertical scanning direction, and a skew correction value $\Delta z$ indicative of inclination of the line, which is defined by the amount of offset in the vertical scanning direction between the points P21 and P22.

Figure 11:
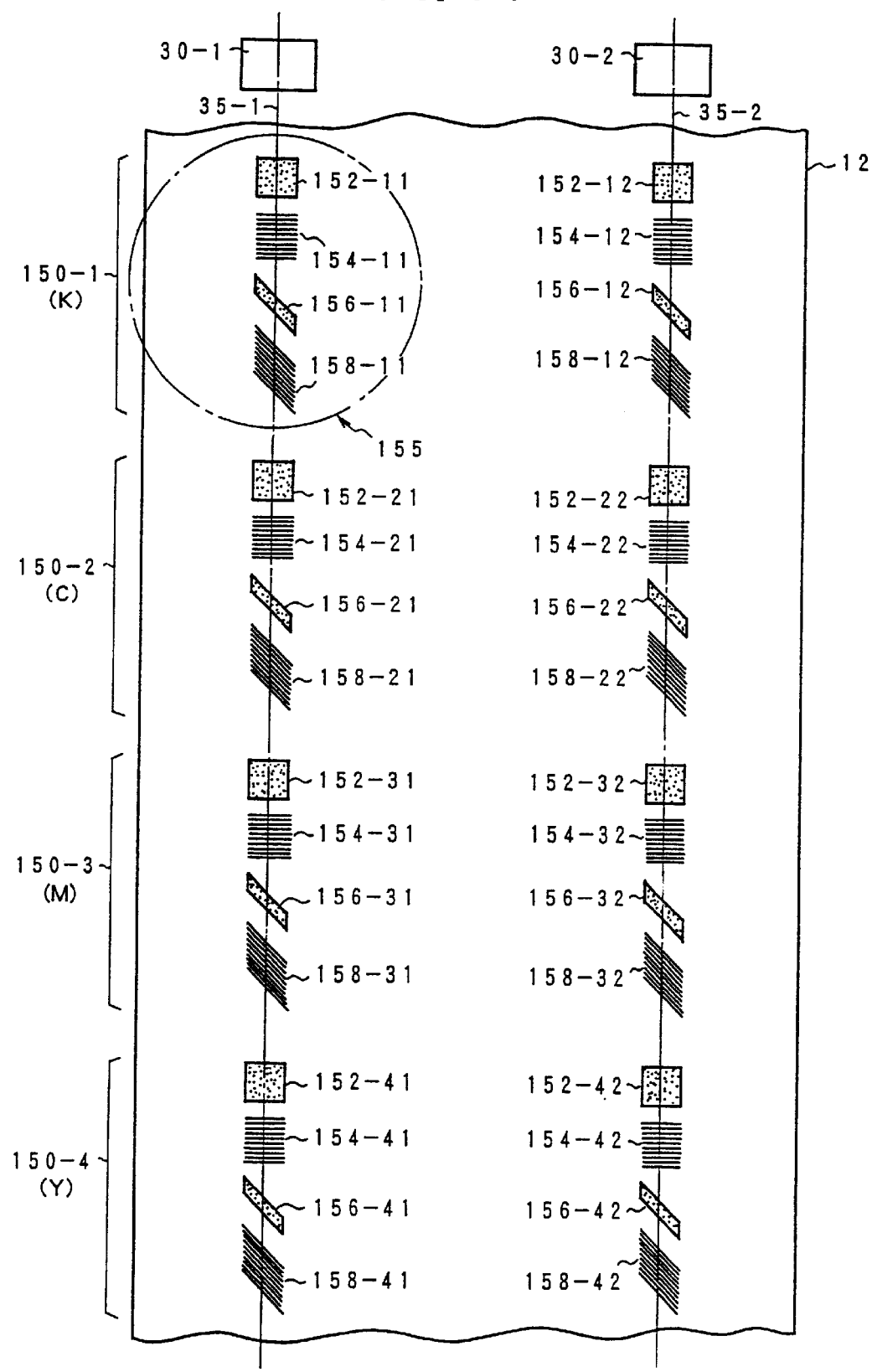
FIG. 11 is an explanatory diagram of the resist marks transferred onto the belt for use in the detection of the position offsets.

In order to detect the positional offset information of FIG. 10, resist marks are transferred onto the endless belt 12 at two points on the leading end side and the trailing end side in the horizontal scanning direction, as shown in FIG. 11, which are then detected by the sensors 30-1 and 30-2. That is, onto the endless belt 12 are separately transferred a resist mark 150-1 for K, a resist mark 150-2 for C, a resist mark 150-3 for M and a resist mark 150-4 for Y in four zones in the vertical scanning direction which is the belt conveyance direction. Among the resist marks 150-1 to 150-4 for K, C, M and Y, the resist mark 150-1 for K on the sensor 30-1 side for instance consists of a color reference premark 152-1, a lateral line 154-11, a slanted line premark 156-11 and a slanted line resist mark 158-11 in sequence from the head.

Figure 12:
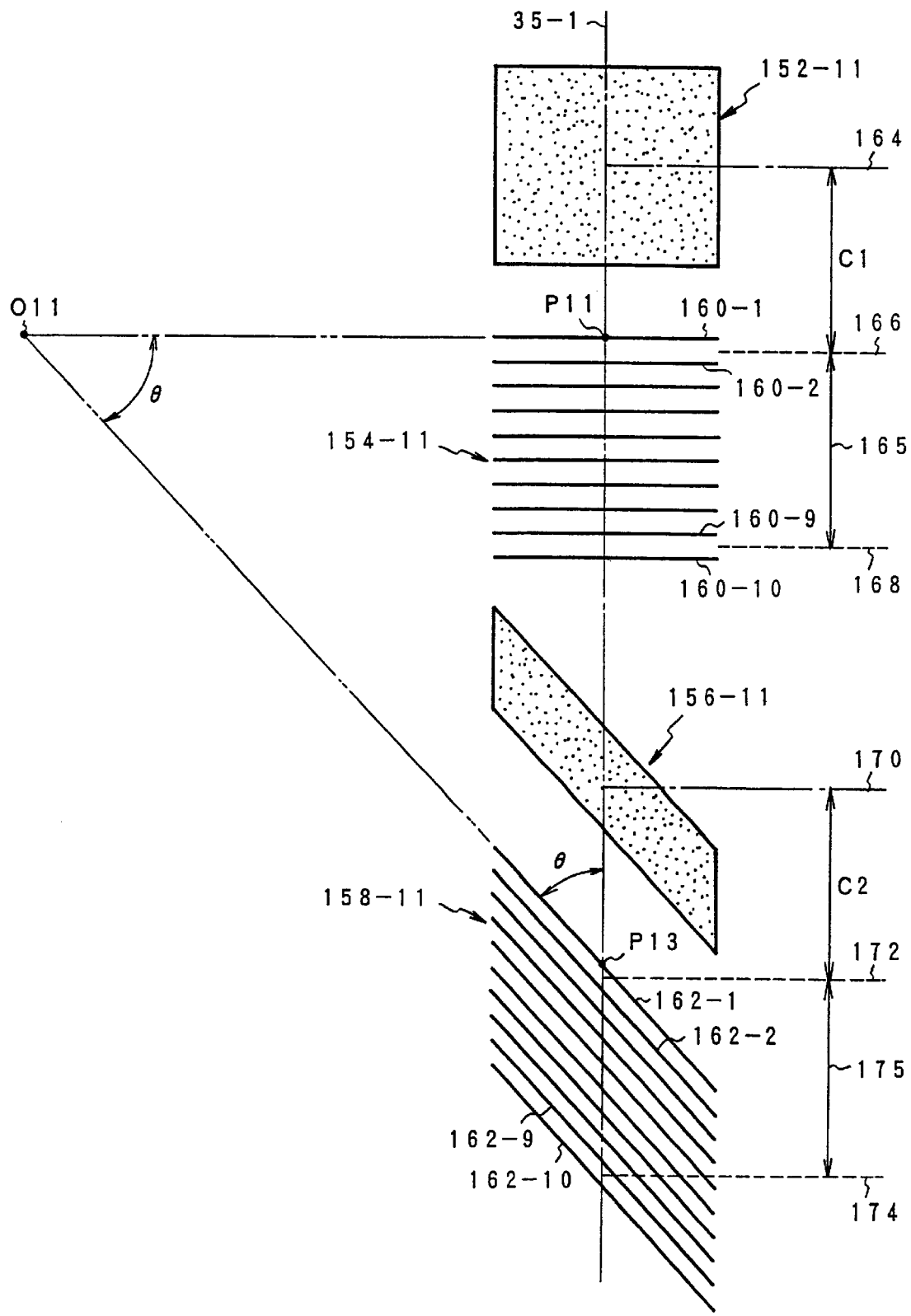
FIG. 12 is an explanatory diagram showing a part of the resist marks of FIG. 11 taken out in an enlarged manner.

FIG. 12 illustrates a portion designated at 155 of FIG. 11, taken out in an exclusive manner. The color reference premark 152-11 provides a reference position for the read start position of the following lateral line resist mark 154-11. The color reference premark 152-11 is read by the sensor 30-1 so that a center position 164 of the color reference premark 152-11 in the vertical scanning direction is detected on the basis of the read signal. The lateral resist mark 154-11 consists of ten lateral lines 160-1 to 160-10 having a predetermined length in the horizontal scanning direction and transferred at a certain pitch. The lateral lines 160-1 to 160-10 of the lateral line resist mark 154-11 are read by the sensor 30-1 and are used to perform Fourier transform. A Fourier calculation range 165 of the lateral line resist mark 154-11 is defined by read signals of eight lateral lines 160-2 to 160-9 intervening between the first and last lateral lines 160-1 and 160-10. A Fourier calculation start position 166 is the leading edge of the Fourier calculation range 165 and is set apart a predetermined nominal distance C1 from the center position 164 detected from the color reference premark 152-11. The slanted line premark 156-11 follows the lateral line resist mark 154-11. In the same manner as the color reference premark 152-11, the slanted line premark 156-11 is also subjected to a detection of its center position 170 in the vertical scanning direction based on a read signal from the sensor 30-1. The slanted line premark 156-11 is followed by the slanted line resist mark 158-11 for performing Fourier transform in the same manner as the lateral line resist mark 154-11. The slanted line resist mark 158-11 consists of ten slanted lines 162-1 to 162-10 arranged at a certain pitch, with an inclined angle θ relative to the sensor read center line in the vertical scanning direction being set at θ=45° for instance. This slanted line resist mark 158-11 has also a Fourier calculation range 175 defined by eight slanted lines 162-2 to 162-9 excepting the first and last slanted lines 162-1 and 162-10. The leading edge of the Fourier calculation range 175 is set apart a predetermined nominal distance C2 from the center position 170 detected from the slanted line premark 156-11. Let P11 be a point of intersection of the center line 35-1 of the sensor 30-1 and the first slanted line 160-1 of the slanted line resist mark 154-11, let P13 be a point of intersection of the center line 35-1 and the slanted line 162-1 of the slanted line resist mark 158-11, and let O11 be a point of intersection of leftward extended lines of the lateral line 160-1 and the slanted line 162-1, then a triangle O11P11P13 results in a right-angled isosceles triangle because of θ=45°. For this reason, if the positions of the points P11 and P13 of intersection are detected by the sensor 30-1 to obtain a distance therebetween, then the distance becomes equal to the distance between the position P11 and the point O11 of intersection. If a positional offset occurs in the horizontal scanning direction in which the resist mark orthogonally intersects the center line 35-1 of the sensor 30-1, the dimensions of the isosceles triangle O11P11P13 will vary in conformity with the positional offset in the horizontal scanning direction. That is, in response to the positional offset in the horizontal scanning direction, the position P11 of the lateral line 160-1 intersecting the center line 35-1 does not vary in the vertical scanning direction whereas the position P13 of the slanted line 162-1 intersecting the center line 35-1 does vary in the vertical scanning direction. Due to the right-angled isosceles triangle having θ=45°, the variation of the position P13 in the vertical scanning direction becomes equal to the variation of the point O11 of intersection in the horizontal scanning direction. Thus, in order to obtain the positional offset in the horizontal scanning direction, the positional offset between the positions P11 and P13 in the vertical scanning direction has only to be detected. It is natural in the case of other than θ=45° that a positional offset in the vertical scanning direction be detected from a relational expression given as tan θ=(length of segment O11–P11)/(length of segment P11–P13)

and then be converted into a positional offset in the horizontal scanning direction. In the case of θ=45°, such a tangent conversion need not be performed since the positional offset in the horizontal scanning direction becomes equal to that in the vertical scanning direction. The configuration of the resist mark of FIG. 12 applies to the remaining resist marks of FIG. 11.

Figure 13:
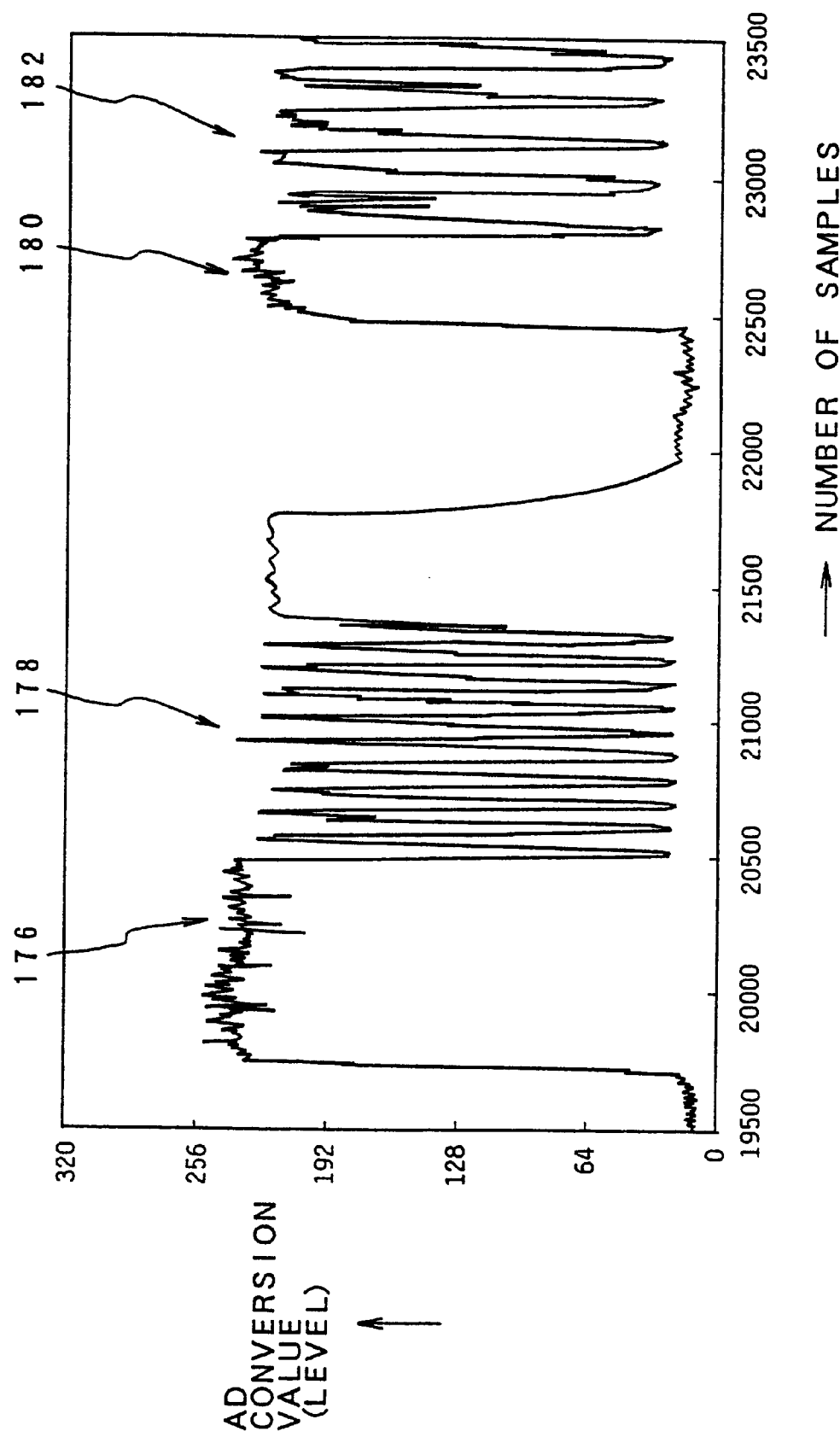
FIG. 13 is an explanatory diagram of the resist mark data read by the sensors.

FIG. 13 illustrates the result of read by the sensor 30-1 of FIG. 11, through the AD converter 68 of FIG. 5, of the portion of the resist mark designated at 155 of the resist mark 150-1 for K. In FIG. 13, the axis of abscissas represents the number of sample pulses of the AD converter 68 in the form of time base information whereas the axis of ordinates represents eight-bit amplitude values in the decimal system. This read waveform consists from left to right of a color reference premark read waveform 176, a lateral line resist mark read waveform 178, a slanted line premark read waveform 180 and a slanted line resist mark read waveform 182. As is apparent from this read waveform, ten waves constituting the lateral line resist mark read waveform 178 used in Fourier transform for instance have amplitude components containing various noise components. For this reason, a single lateral line resist mark cannot ensure the accurate detection of positions due to its noise component. The present invention utilizes Fourier transform in order to eliminate the influence of noises contained in the read waveform.

Figure 14:
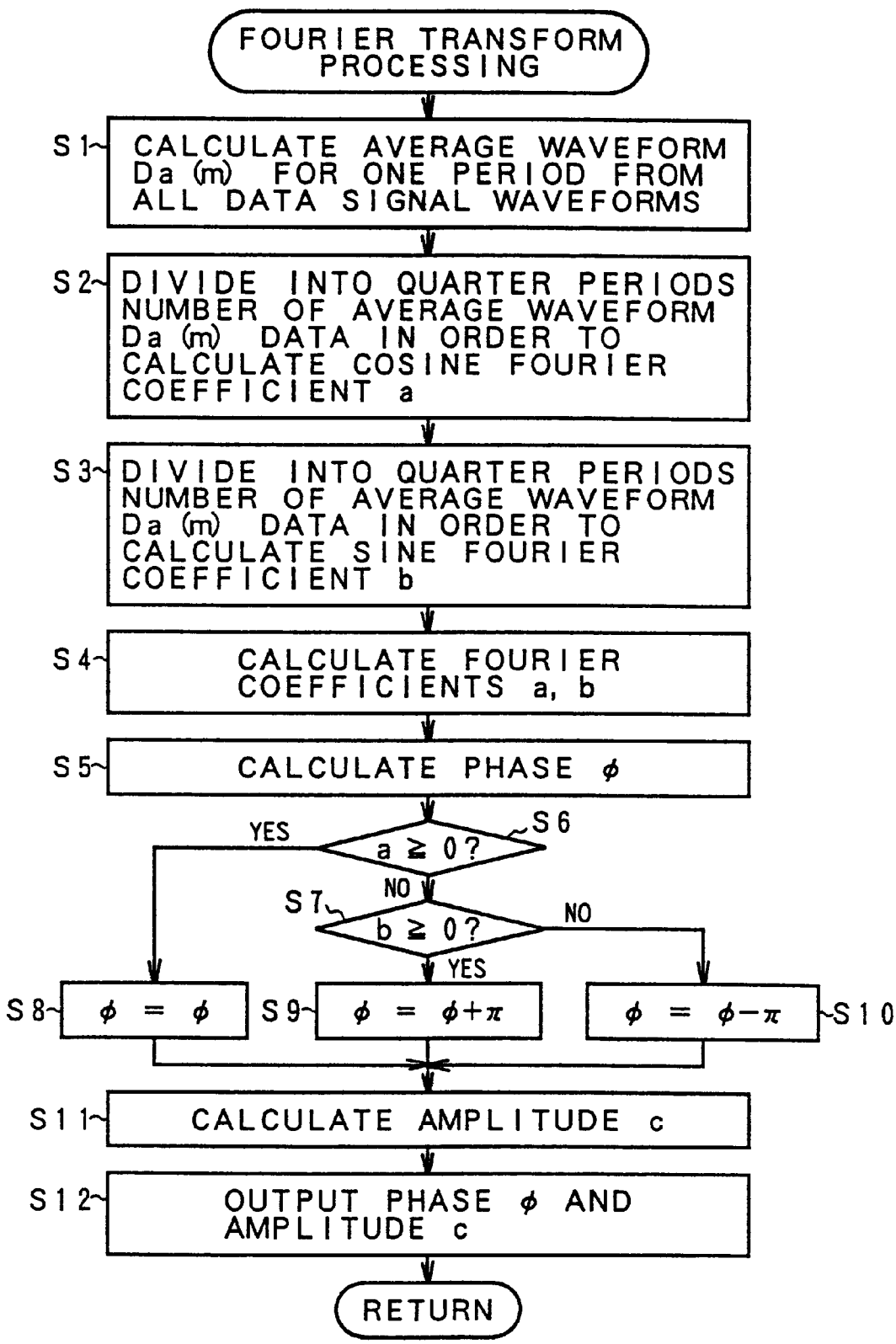
FIG. 14 is a flowchart of Fourier transform processing for performing the detection of positions.

FIG. 14 illustrates Fourier transform processing, to which discrete Fourier transform is applied, for the detection of positions based on the read waveforms of the lateral resist mark 154-11 and the slanted resist mark 158-11 of FIG. 13. First in step SI, an average value of waveform data for one period is calculated from all the data. Let Nd be the total number of data to be Fourier transformed, then the raw data are given as $$D(0), D(1), D(2) \ldots D(Nd-1) \quad (1)$$

Furthermore, let Nm be a period of the Fourier transform, where Nm is expressed in the form of floating point. The average of the waveform data for one period is then calculated. Let Nt be the number of samples lying between the lines, then $$Nt=Int (Nm) \quad (2)$$

where Int ( ) means that the value having the floating point within the parentheses is transformed into an integer. Let Ns be the number of waves contained in Nd pieces of all data, then $$Ns=Int (Nd/Nm) \quad (3)$$

A mean value Da(m) of the waveform data for one period is then calculated using the expression $$D(M) = \left\{ \sum_{i=0}^{Na-1} D(n) \right\} / Ns \quad (4)$$

where m is a data number within the foremost one period with m=0, 1, 2, ... Nt−1, and n is a position (number) of m-th data within all data in the respective periods of Ns in number, with $$n=(i\times Nm)+m \quad (5)$$

Description is made for instance of the calculation of a mean Da(0) of the foremost position m=0 in one period. The position n of the foremost data in the respective periods of Ns in number for use in the average calculation is given from the expression (5) as n=0, Nm, 2Nm, ... (Ns−1) Nm Thus, from among all the data of the expression (1), data on D(0), D(Nm), D(Nm), ... D{(Ns−1) Nm} are selected to obtain the sum, which is divided by the total number of the periods Ns. That is, $$Da(0)=[D(0)+D(Nm)+D(Nm)+ \ldots +D\{(Ns-1)Nm\}]/Ns \quad (6)$$

follows. In the same manner, means values Da(1), Da(2), ... Da(Nt−1) are calculated of the remaining m=1, 2, ..., (Nt−1) th data within one period. In step S2, the number of data of the average waveform data Da (m) is divided at quarter periods in order to calculate a cosine Fourier coefficient b.

$$Dc(i)=Da(i)-Da(Nt/2-1-i)-Da(Ni/2+1)+Da (Nt-1-i) \quad (7)$$

where i=0, 1, 2, ... Nt/4−1.

In step S3, the number of data of average waveform data Da(m) is divided at quarter periods in order to calculate a sine Fourier coefficient b.

$$Ds(i)=Da(i)+Da(Nt/2-1-i)-Da(Nt/2+i)-Da (Nt-1-i) \quad (8)$$

where i=0, 1, 2, ... Nt/4−1. Then in step S4, the Fourier coefficients a and b are calculated from the following expression.

$$a = \frac{2}{Nt} \sum_{i=0}^{Nt/4-1} \{Dc(i) \times W(i)\} \quad (9)$$

$$b = \frac{2}{Nt} \sum_{i=0}^{Nt/4-1} \{Ds(i) \times W(Nt/4 - i)\} \quad (10)$$

where W(i) results in $$W(i) = \cos(2\pi i/Nt) \quad (11)$$

Then in step S5, a phase φ is obtained from the following expression.

$$\phi = \text{Arc Tan}(B/A) \quad (12)$$

Then in steps S6 to S10, corrections are made to extend the range of the phase difference φ from ±π/2 to ±π. If a ≧0 in step S6, then the procedure advances to step S8 allowing φ=φ as it is. If a <0 in step S6, then b ≧0 is judged in step S7. If b ≧0, then a correction is made so that φ=φ+π is established in step S9, whereas if b <0, then a correction is made so that φ=φ−π is established in step S10.

In step S11, an amplitude c is obtained from the following expression.

$$c = \sqrt{(a_2 + b^2)} \quad (13)$$

Finally in step S12, the phase φ and the amplitude c are provided as outputs. Although in this description the expression (4) is used to calculate the mean value Da (m) of the waveform data for one period, the following expression may be used in order to enhance the calculation accuracy instead of using the expression (4) for the average calculation based on the number Ns of waves.

$$Da(m) = \sum_{t=0}^{Na-1} D(n) \quad (14)$$

In this case, the expressions (9) and (10) are used to calculate the mean values in the form of $$a = \frac{2}{Nt \times Ns} \sum_{i=0}^{Nt/4-1} \{Dc(i) \times W(i)\} \quad (9a)$$

$$b = \frac{2}{Nt \times Ns} \sum_{i=0}^{Nt/4-1} \{Ds(i) \times W(Nt/4 - i)\} \quad (10a)$$

Figure 15:
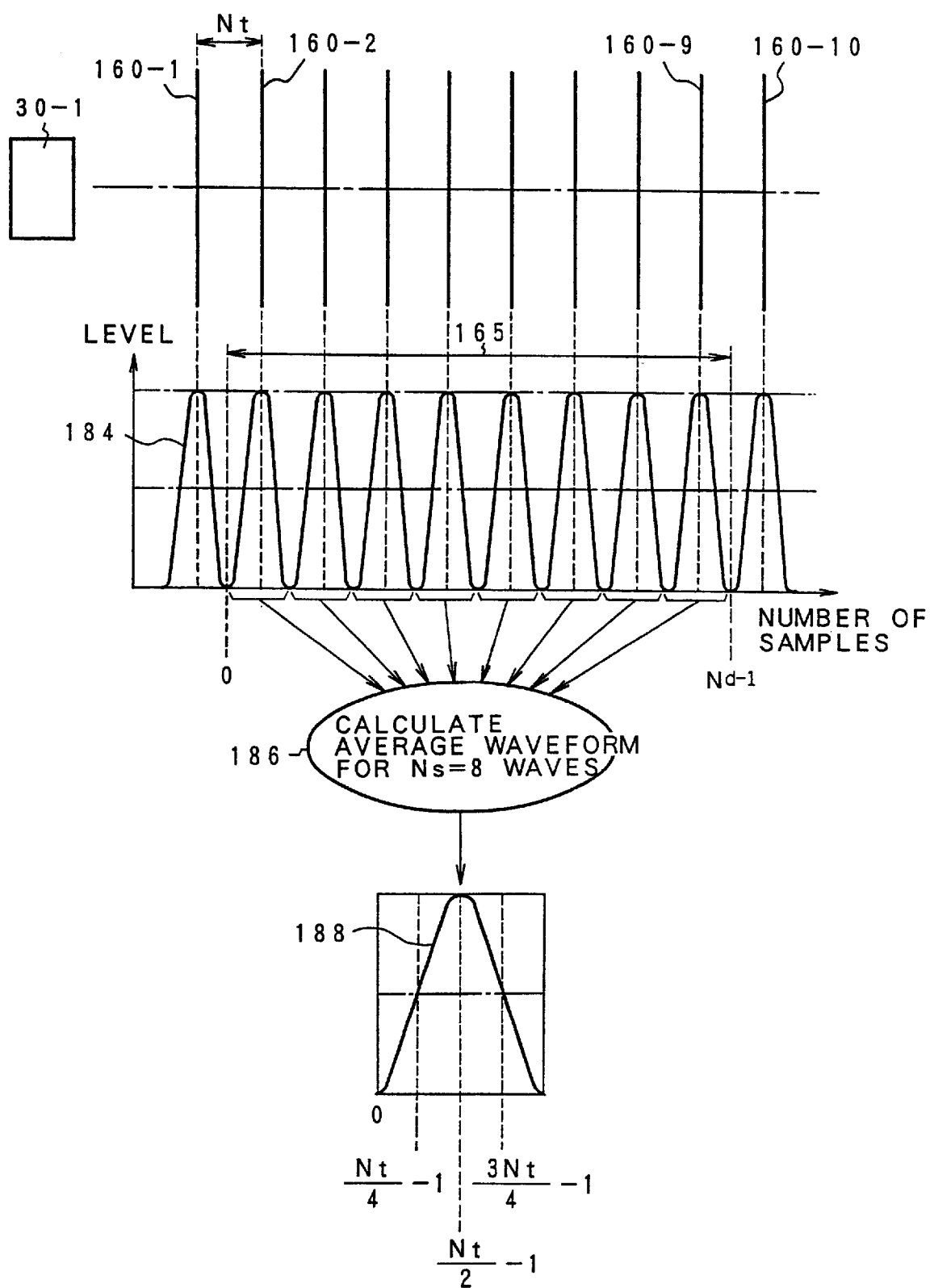
FIG. 15 is an explanatory diagram of waveform processing in the Fourier transform.

FIG. 15 schematically illustrates the state of the Fourier transform processing of FIG. 14. That is, by reading the lateral line resist mark 154-11 by use of the sensor 30-1, there can be obtained a read waveform 184 as sample data through AD conversion. Although this read waveform 184 consists of ten waves corresponding to the ten lateral lines 160-1 to 160-10, Fourier transform is applied to the Fourier calculation range 165 defined by the read waveform of the eight lateral lines 160-02 to 160-8 excepting the first and last lateral lines 160-1 and 160-10. The number of sample data within the Fourier calculation range 165 is Nd with the number of the waves being Ns=8. As shown in an arithmetic unit 186, the expression (4) is used to calculate an average waveform of the read waveform 184 for eight periods contained within the Fourier calculation range 165, to obtain an average waveform 188 for one period. The average waveform 188 is divided at quarter periods to calculate the expressions (7) and (8). The expressions (9) and (10) are then used to calculate the Fourier coefficients a and b of the waveforms divided at quarter periods, with the phase φ as the positional offset information being obtained from the expression (12), after which the amplitude c is obtained from the expression (13).

Figure 16A:
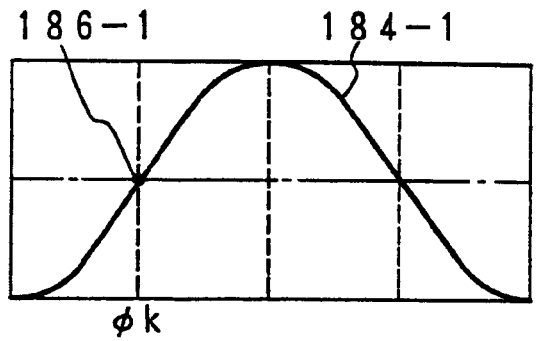
FIGS. 16A to 16D are explanatory diagrams of phases of K, C, M and Y resist marks obtained through the Fourier transform.
Figure 16B:
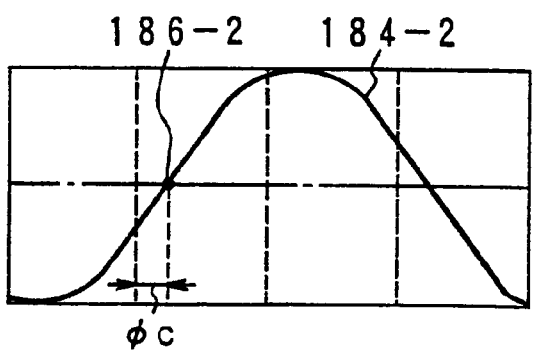
Figure 16C:
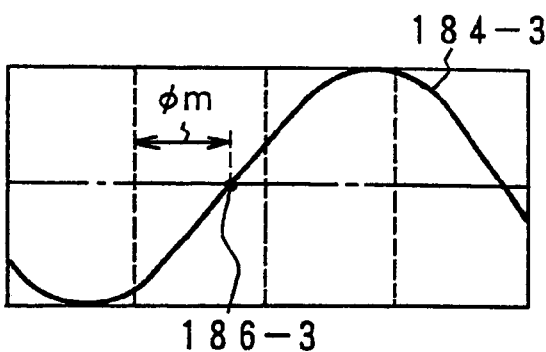
Figure 16D:
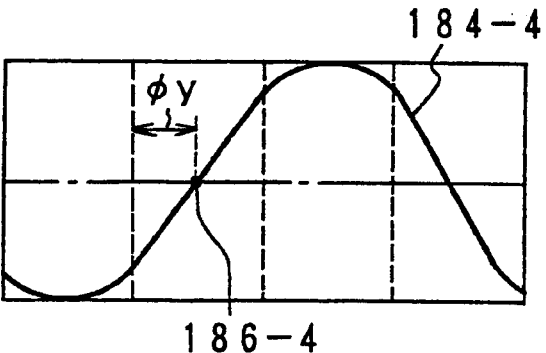

FIGS. 16A to 16D illustrate signal waveforms for one period obtained respectively when the Fourier transform processing of FIG. 15 is applied to the resist marks 150-1 to 150-4 for K, C, M and Y of FIG. 12. More specifically, FIG. 16A depicts a signal waveform 184-1 of the resist mark for K, the signal waveform having a phase φk corresponding to a point 186-1 of the waveform 184-1, which serves as a phase reference for the other color components. FIG. 16B depicts a signal waveform 184-2 for C having a phase φc. FIG. 16C depicts a signal waveform 184-3 for M having a phase φm designated at a point 186-3. FIG. 16D depicts a signal waveform 184-4 for Y having a phase φy designated at a point 186-4. This allows the respective positional offsets to be represented by the phases φc, φm and φy of the remaining color components C, M and Y relative to the reference K signal waveform 184-1. Since the phases φc, φm and φy representing the positional offsets have the number of samples for one period equal to Nm, the value Nm for one period can be multiplied by (φ/2π) to convert the phase φ into the number of samples representative of the positional offsets.

Figure 18:
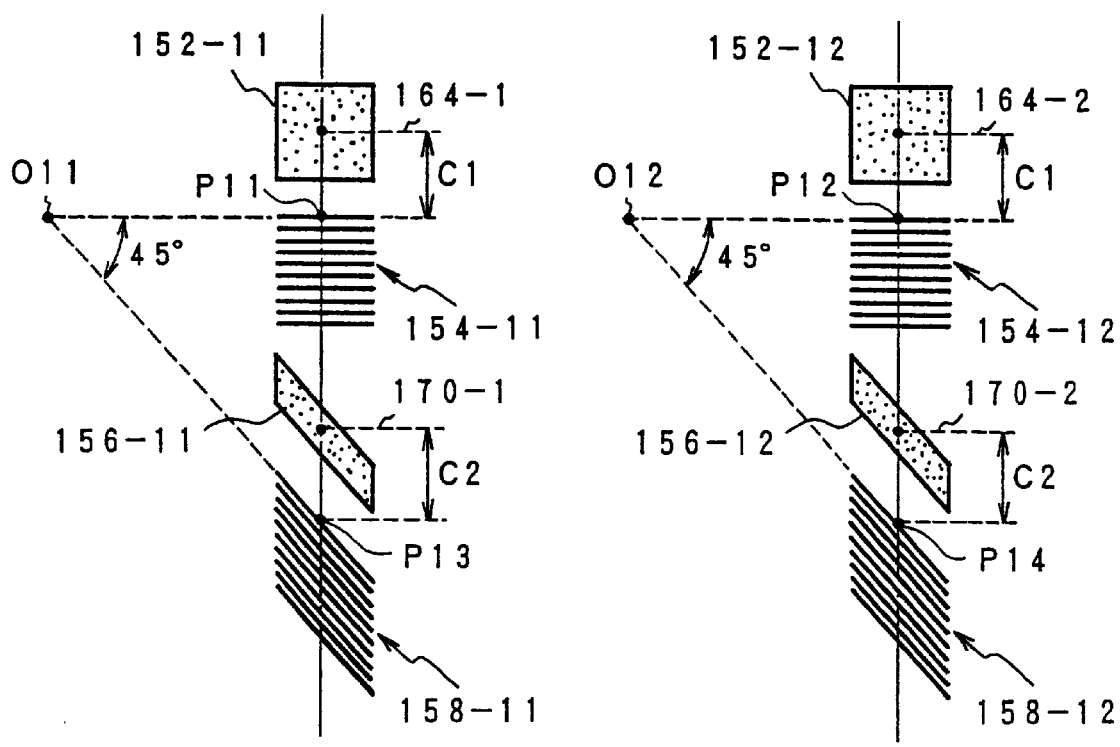
FIG. 18 is an explanatory diagram of the detection of positions of. the resist marks for K.

FIGS. 17A and 17B are flowcharts of the positional offset detection processing in accordance with the present invention using the detection of positions of the resist marks based on the Fourier transform processing of FIG. 14. First in step S1, the resist marks 15-1, 15-2, 150-3 and 150-4 of four colors K, C, M and Y, respectively, are transferred onto the belt at two points on the leading edge side and the trailing edge side, as shown in FIG. 11. Then in step S2, detection is made of center positions 164-1 and 164-2 of foremost lateral lines 152-11 and 152-12, respectively, of the first resist mark 150-1 for K shown taken out in FIG. 18. Then in step S3, detection is made of a Fourier transform read start position apart a predetermined nominal distance C1 from the lateral line premark centerpositions 164-1 and 164-2, to read lateral resist marks 154-11 and 154-12. Through the Fourier transform processing of FIG. 14, the restrictive phases φ1 and φ2 are detected of the read waveforms of the lateral line resistmarks 154-11 and 154-12, to calculate the lateral line positions Pn1 and Pn2 from the following expression, where n represents the color numbers for K, C, M ad Y, with n=1 for K, n=2 for C, n=3 for M and n=4 for Y.

Pn1=C1+φn1(Nm/2π)

Pn2=C1+φn2(Nm/2π)

Then in step S5, detection is made of center positions 170-1 and 170-2 of the subsequent slanted line premarks 156-11 and 156-12. In step S6, detection is made of Fourier transform read start positions apart a predetermined nominal distance C2 therefrom to read slanted line resist marks 158-11 and 158-12. Then in step S7, phases φ13 and φ14 are detected through the Fourier transform of FIG. 14 to detect slanted positions Pn3 and Pn4 from the following expressions.

Pn3=C2+φn3(Nm/2π)

Pn4=C2+φn4(Nm/2π)

Then in step S8, a check is made to see if the four colors K, C, M and Y have been subjected to the processing of the steps S2 to S7. If not, then the procedure returns to the step S2 to repeat the same position detection processing of the remaining color components. After the completion of the position detection of the four colors K, C, M and Y in steps S2 to S8, calculation is made of an absolute position Xk of K in the horizontal scanning direction in step S9 from the following expression.

(Absolute position Xk in horizontal scanning direction)=[{left slanted line position P13–left lateral line position P11)+(right slanted line position P14)–(right lateral line position P12)}/2]× (Ln/Ls) (15)

where (Ln/Ls) is a ratio of a correction unit amount Ln in the horizontal scanning direction to a sampling pitch Ls, and is a conversion coefficient for converting the number of samples indicative of the distance in the vertical scanning direction obtained from the right side of the expression (14)

$$\{(P13-P11)+(P14-P12)\}/2 \qquad (16)$$

into a correction unit amount Ln in the horizontal scanning direction. The sampling pitch Ls for instance results in $$\begin{aligned} Ls &= \text{belt velocity} \times \text{sampling period } ts \\ &= 57,000 \,\mu m/s \times 100 \,\mu s \\ &= 5.7 \,\mu m \end{aligned}$$

The correction unit Ln in the horizontal scanning direction results in Ln=14.111 μm which depends on the pitch intervals between LED chips in the LED array. In this case, the conversion ratio results in $$\begin{aligned} (Ln/Ls) &= 14.111 \,\mu m / 5.7 \,\mu m \\ &= 2.475614 \end{aligned}$$

Providing that the number of samples derived from the expression (15) is 1600, the absolute position Xk in the horizontal scanning direction results in Xk=3960

The absolute position Xk=3960 in the horizontal scanning direction means that the number of the correction units Ln=14.111 μm is 3960, which is converted into a distance in the horizontal scanning direction given as $$\begin{aligned} Xk &= 3960 \times 14.111 \,\mu m \\ &= 55879.56 \,\mu m \end{aligned}$$

Then in step S10, a skew absolute value Zk of K is calculated from the following expression K skew absolute value Zk=(K right lateral line position P12)–(K left lateral line position P11) (17)

Subsequently, in step S11, calculation is made of correction values Δx of C, M and Y in the horizontal scanning direction, with the absolute position Xk of K in the horizontal scanning direction employed as the reference, using the following expression.

Correction value Δx in horizontal scanning direction=[{(left slanted line position Pn3)–(left lateral line position Pn1]+(right slanted line position Pn4)–(right lateral line position Pn2)}/2] × (Ln/Ls)–(absolute position Xk in horizontal scanning direction) (18)

where n=2 for cyan C, n=3 for magenta M and n=4 for yellow Y.

Then in step S12, calculation is made of the correction values Δy of C, M and Y in the vertical scanning direction with the reference K using the following expression CMY correction value Δy in vertical scanning direction=(CMY lateral line position Pn1)–(K left lateral line position P11)–(K–CMY inter-transfer distance)/(belt velocity Vb) (19)

Finally, in step S13, calculation is made of skew correction values Δz of C, M and Y with the reference skew absolute value Zk of K obtained in step S10, using the following expression CMY skew correction value Δz=(CMY right lateral line position Pn2)–(CMY left lateral line position Pn1)–(K skew absolute value Zk) (20)

Figure 19:
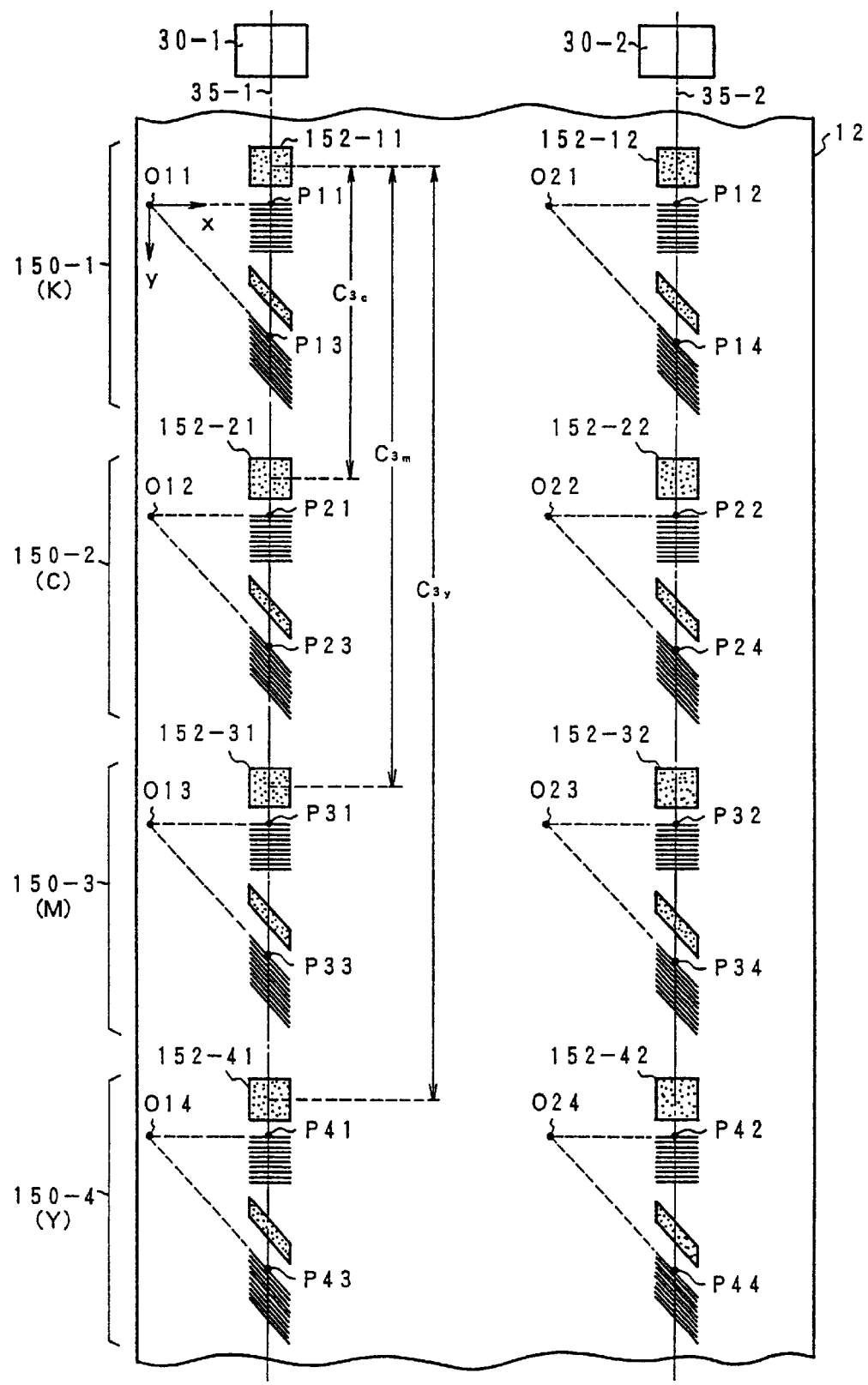
FIG. 19 is an explanatory diagram of relations of the positions of the K, C, M and Y resist marks.

FIG. 19 illustrates a predetermined nominal distance C3 providing (K–CMY inter-transfer distance) of the expression (18) for use in the calculation of the C, M and Y correction values Δy in the vertical scanning direction with the reference K in step S12 of FIG. 17B. More specifically, the nominal distance C3 is given in the form of C3c, C3m and C3y which are the nominal distances between the center positions of the color reference premarks 152-11 to 152-41, and 152-12 to 152-42 of the K, C, M and Y resist marks 150-1 to 150-4. Relations are also illustrated of the points O11 to O24 of intersection of extended lines of the lateral line resist marks and the slanted line resist marks in the respective resist marks 150-1 to 150-4.

Figure 20A:
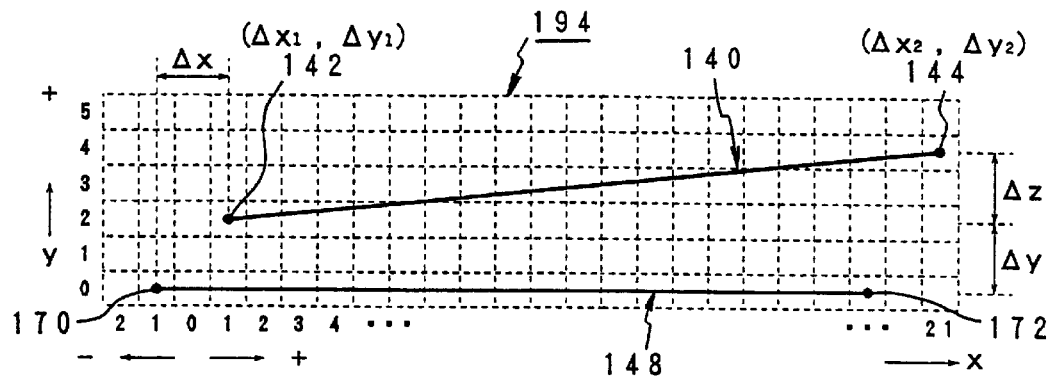
FIGS. 20A to 20D are explanatory diagrams of a principle of the correction processing based on results of the positional offset detection of the present invention.
Figure 20B:
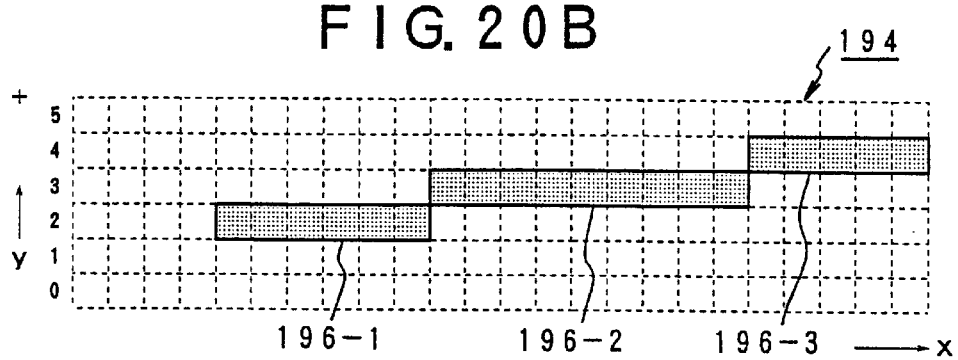
Figure 20C:
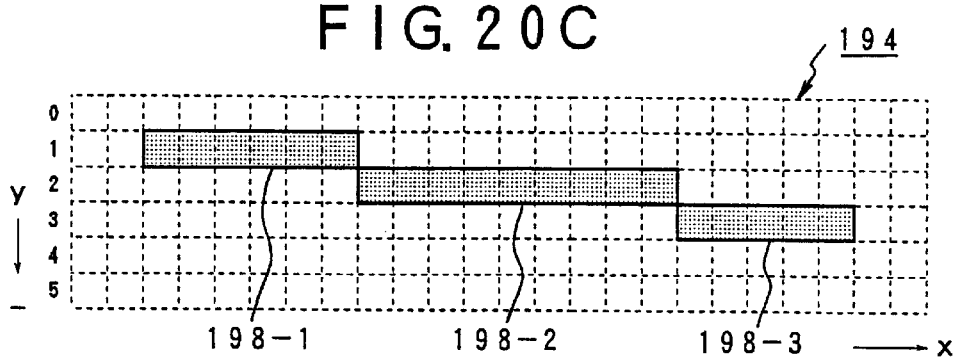
Figure 20D:
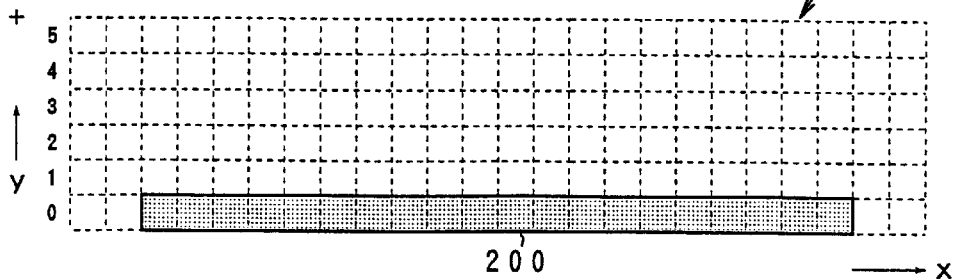

FIGS. 20A to 20D illustrate the correction and print of pixel data based on the positional offset correction values derived from the positional offset detection unit 116 in the positional offset correction unit 124 of FIG. 7. The result of detection of a positional offset of the object print line 140 relative to the K resist mark reference of FIG. 10 is converted into a positional offset within a bit map memory space 194 partitioned at one-pixel pitch in both the horizontal scanning direction x and the vertical scanning direction y as shown in FIG. 20A. In the bit map memory space 194 of FIG. 20A, the ideal print line 148 is first determined, relative to which the object print line 140 is set through the actual transfer. That is, by using the positional offset correction value Δx in the horizontal scanning direction relative to the reference K, the positional offset correction value Δy in the vertical scanning direction and the skew correction value Δz, it is possible to set the object print line 140 within the bit map memory space 194. The conversion of this object print line 140 into pixel data allows a generation of positional offset correction data 196-1 to 196-3 as shown in FIG. 20B. Correction data 198-1 to 198-3 shown in FIG. 20C are derived from the positional offset correction data 196-1 to 196-3 of FIG. 20B. The detection object line 140 of FIG. 20A is inverted to the minus side symmetrically with respect to the ideal print line 148 and then is shifted, by the positional offset correction value Δx in the horizontal scanning direction, to the minus side (leftward) in the horizontal scanning direction, with the resultant line being converted into the correction data 198-1 to 198-3 within the bit map memory space 194. When these correction data of FIG. 20C are read out and the LED array is driven for light emission, there can be obtained a print result 200 corresponding to the ideal print line 148 of FIG. 20A as a result of the correction of the positional offset of FIG. 20B.

FIG. 21 illustrates correction tables 126C, 126M and 126Y for C, M and Y, respectively, created from the correction data of FIG. 20C, with the content of the tables being stored in the positional offset information storage unit 126 provided in the positional offset correction unit 124 of FIG. 8.

According to the present invention as hereinabove described, employed as the reference image is a color image of any one of a plurality of electrostatic recording units arranged in the record paper conveyance direction, and a plurality of lateral lines and slanted lines are transferred onto a belt surface at certain pitches to form thereon striped patterns for the detection of positional offsets of color images of the other electrostatic recording units, with the sensors reading the striped patterns to issue detection signals, whose positions are accurately detected from the phases through the application of the Fourier transform. Thus, even in cases where the toner is not allowed to lie uniformly on resist marks such as lateral lines, slanted lines, etc., transferred onto the belt or where noise gets mixed with the sensor detection signals, it is possible to achieve an accurate detection of coincidence based on the resist marks without being affected by the errors attributable to the noise mixing, to consequently achieve an accurate positional correction to realize a high-precision color matching.

It is to be appreciated that although the present invention is applied by way of example to the printing apparatus to be connected to the word processors or the personal computers for use, it could be applied to any apparatuses in the form of multi-color electrostatic recording apparatuses using the electrostatic recording units arranged in tandem to transfer a plurality of color toners onto the record paper. Furthermore, the present invention is not intended to be limited by the numerical values indicated in the embodiments.

What is claimed is:

1. A color image forming apparatus, comprising:

a conveyance mechanism including a belt moving at a certain velocity for conveying record paper in an adhered manner;

a plurality of electrostatic recording units arranged in the direction of conveyance of the record paper for forming a latent color image in conformity with image data through optical scanning of a photosensitive drum, to develop the latent image with different color toner components to thereafter transfer the thus developed image onto the record paper on said belt;

a positional offset detection unit including at least a sensor for optically detecting a plurality of resist marks of color toner components transferred onto said belt at predetermined pitches by said plurality of electrostatic recording units;

said sensor including a condensing lens through which a light from a predetermined laser diode is condensed and is irradiated onto a belt transfer surface as a spot light of the order of several ten microns, one or more light receiving elements arranged at a predetermined output angle for receiving scattered light as a result of the irradiation of the spot light on the toner components transferred onto said belt transfer surface, allowing said sensor to issue a sensor detection signal;

said positional offset detection unit detecting positions of said resist marks from said spot light detected by said sensor, at least to detect positional offsets, relative to a reference resist mark of any one color, of the resist marks of the other colors; and a positional offset correction unit for relatively correcting said plurality of recording units other than said electrostatic recording unit associated with said reference image, on the basis of said positional offset detection unit, so as to eliminate any positional offsets, relative to said reference image, of the other color images.

2. A color image forming apparatus according to claim 1, wherein for use of said sensor, the back of said belt surface on which is irradiated said spot light from said laser diode is provided with a cavity for suppressing the scattered light from the back side of said belt.

* * * * *